US010830344B1

(12) United States Patent
Sakaguchi et al.

(10) Patent No.: US 10,830,344 B1
(45) Date of Patent: Nov. 10, 2020

(54) SHIFT RANGE CONTROL DEVICE

(71) Applicant: DENSO CORPORATION, Kariya (JP)

(72) Inventors: Kouji Sakaguchi, Kariya (JP); Seiji Nakayama, Kariya (JP); Jun Yamada, Kariya (JP); Haruka Miyano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/930,840

(22) Filed: May 13, 2020

(30) Foreign Application Priority Data

May 22, 2019 (JP) ................................ 2019-096085

(51) Int. Cl.
*F16H 61/12* (2010.01)
*F16H 61/32* (2006.01)

(52) U.S. Cl.
CPC ............. *F16H 61/12* (2013.01); *F16H 61/32* (2013.01); *F16H 2061/1208* (2013.01); *F16H 2061/326* (2013.01)

(58) Field of Classification Search
CPC .. F16H 61/02; F16H 61/32; F16H 2061/1208; F16H 2061/122; F16H 2061/1232; F16H 2061/1268; F16H 2061/326
See application file for complete search history.

(56) References Cited

U.S. PATENT DOCUMENTS

| 4,958,287 A * | 9/1990 | Sugimura ............. B60W 10/06 477/125 |
| 2017/0104435 A1* | 4/2017 | Nagata ................... H02P 29/024 |
| 2019/0195354 A1 | 6/2019 | Kamio |

* cited by examiner

*Primary Examiner* — Edwin A Young
(74) *Attorney, Agent, or Firm* — Nixon & Vanderhye P.C.

(57) ABSTRACT

A shift range control device that switches a shift range by controlling driving of a motor includes a plurality of control units and a plurality of motor drivers. The plurality of control units respectively have an energization control unit for controlling energization to the motor and an abnormality monitor unit for performing abnormality monitoring. The energization control unit turns off energization of the own system in a state of temporary abnormality before determining a decisive abnormality when abnormality affecting the other system is detected in the own system while driving the motor by the plurality of systems, and the abnormality monitor unit determines whether a state of abnormality is the temporary abnormality or the decisive abnormality after turning off energization of the own system.

8 Claims, 19 Drawing Sheets

SHIFT RANGE CONTROL DEVICE

CROSS REFERENCE TO RELATED APPLICATION

The present application is based on and claims the benefit of priority of Japanese Patent Application No. 2019-096085, filed on May 22, 2019, the disclosure of which is incorporated herein by reference.

TECHNICAL FIELD

The present disclosure generally relates to a shift range control device.

BACKGROUND INFORMATION

The related art includes a shift range control device that switches a shift range by controlling driving of a motor. For example, in the related art, when driving of a motor is controlled by one of two microcomputers and an abnormality occurs in a microcomputer used for motor drive control, the microcomputer is switched from one to the other, i.e., from the one used for motor drive control to another microcomputer, for continuation of drive control, for example.

By the way, when one motor is driven by a plurality of systems, if an abnormality occurs in part of the plurality of systems, the situation may lead to a lock or an unintended operation of the motor, due to the interference of an abnormal system with a normal system, for example.

SUMMARY

It is an object of the present disclosure to provide a shift range control device capable of appropriately switching a shift range even when an abnormality occurs in part of a plurality of systems.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described based on the drawings.

First Embodiment

Figure 1:
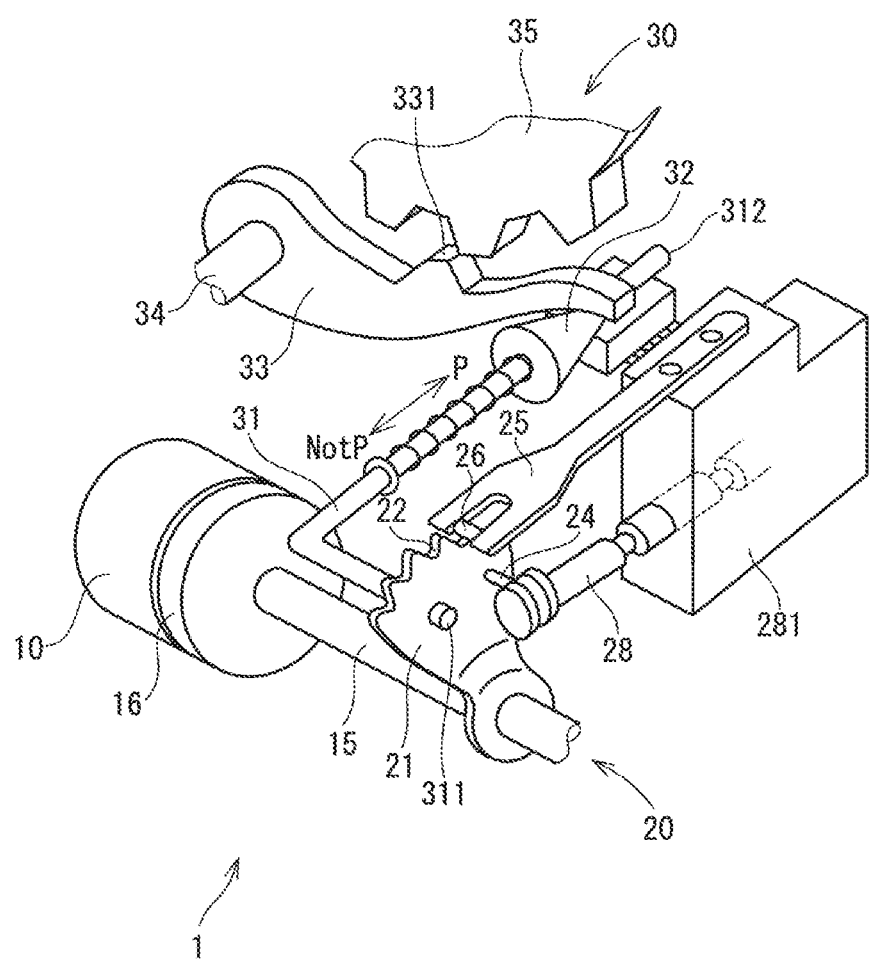
FIG. 1 is a perspective view of a shift-by-wire system according to a first embodiment.
Figure 2:
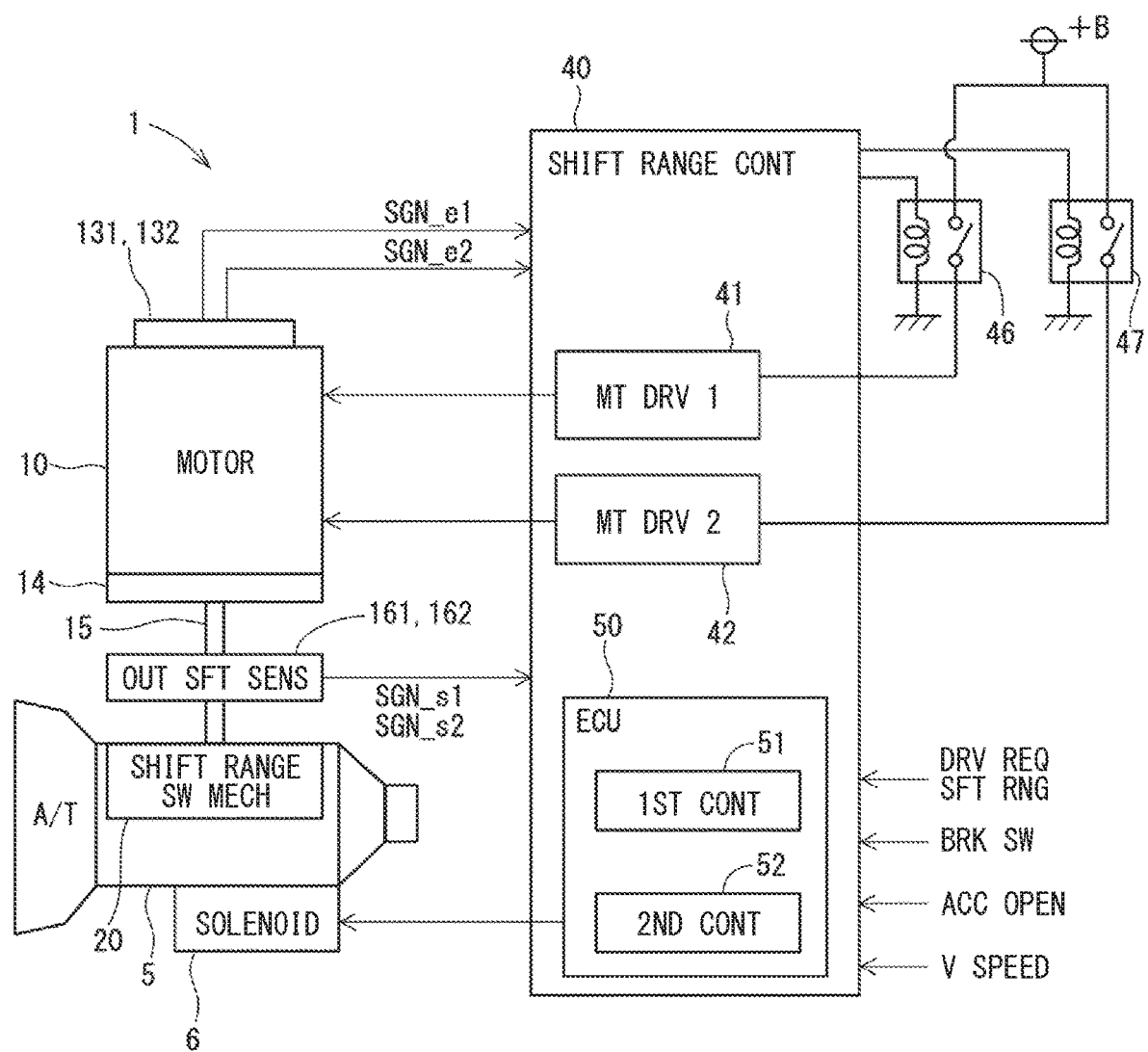
FIG. 2 is a schematic configuration diagram of the shift-by-wire system according to the first embodiment.

The shift range control device according to the present disclosure is described below with reference to the drawings. In a plurality of embodiments described below, a substantially identical component is designated by the same reference number to eliminate duplicated description. The first embodiment is illustrated in FIGS. 1 to 11. As shown in FIGS. 1 and 2, a shift-by-wire system 1 includes a motor 10, a shift range switching mechanism 20, a parking lock mechanism 30, a shift range control device 40, and the like.

The motor 10 is rotated by electric power supplied from a battery which is installed in a vehicle (not shown) and functions as a power source of the shift range switching mechanism 20. The motor 10 of the present embodiment is a direct current (DC) brushless motor, but may be a switched-reluctance motor or the like.

As shown in FIG. 2, encoders 131 and 132, which are motor rotation angle sensors, detect a rotation position of a rotor (not shown) of the motor 10. The encoders 131 and 132 are, for example, magnetic rotary encoders, and include a magnet that rotates integrally with the rotor, a magnetic detection Hall IC, and the like. The encoders 131 and 132 output encoder signals SGN_e1 and SGN_e2 that are three-phase pulse signals at every predetermined angle in synchronization with the rotation of the rotor.

Figure 5:
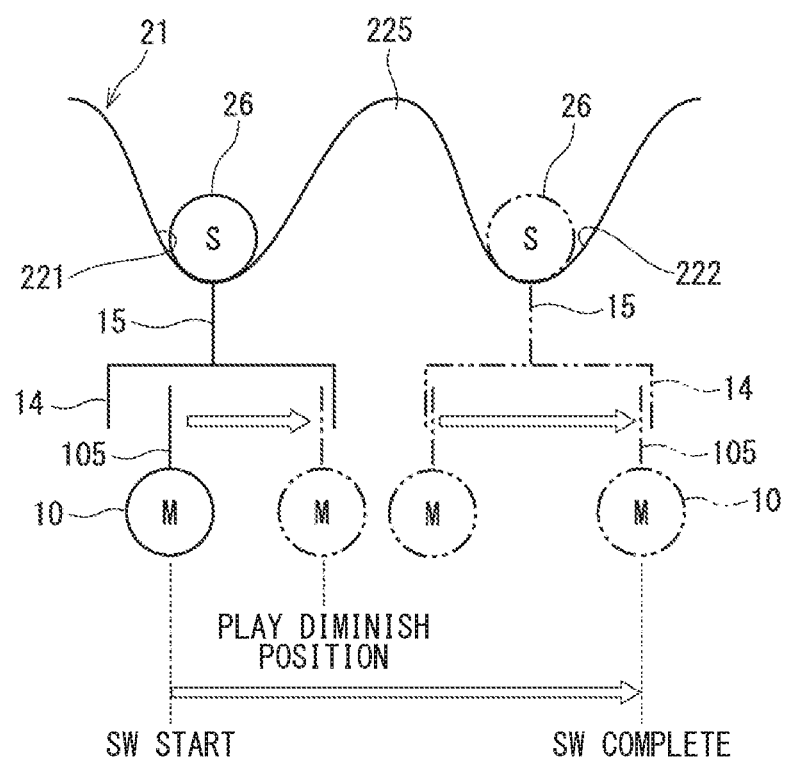
FIG. 5 is a schematic diagram of a relationship among a motor shaft, an output shaft, and a detent plate according to the first embodiment.

A speed reducer 14 is provided at a position between a motor shaft 105 and an output shaft 15 of the motor 10 (refer to FIG. 5). The speed reducer 14 reduces speed of the rotation of the motor 10 and outputs the rotation of the motor 10 to the output shaft 15. The rotation of the motor 10 is thus transmitted to the shift range switching mechanism 20. The output shaft 15 is provided with output shaft sensors 161 and 162 for detecting an angle of the output shaft 15, and outputs output shaft signals SGN_s1 and SGN_s2 respectively corresponding to a rotation position of the output shaft 15. The output shaft sensors 161 and 162 are, for example, potentiometers.

As shown in FIG. 1, the shift range switching mechanism 20 includes a detent plate 21, a detent spring 25 that is a biasing member, and the like, and transmits a rotational driving force output from the speed reducer 14 to a manual valve 28 and to the parking lock mechanism 30. The detent plate 21 is fixed to the output shaft 15 and driven by the motor 10.

The detent plate 21 has a pin 24 protruding in parallel with the output shaft 15. The pin 24 is connected to the manual valve 28. As the detent plate 21 is driven by the motor 10, the manual valve 28 reciprocates (i.e., moves back and forth) in an axial direction. That is, the shift range switching mechanism 20 converts the rotational movement of the motor 10 into a linear movement, and transmits the linear movement to the manual valve 28. The manual valve 28 is provided on a valve body 29. The reciprocating movement in the axial direction of the manual valve 28 switches hydraulic pressure supply paths to a hydraulic clutch (not shown) to switch an engagement state of the hydraulic clutch, so that the shift range is switched.

A detent spring 25 side of the detent plate 21 is provided with four concave portions 22 for holding the manual valve 28 at positions corresponding to the respective shift ranges. The concave portion 22 corresponds to each of four shift ranges of D (Drive), N (Neutral), R (Revers), and P (Parking) from a base side of the detent spring 25.

The detent spring 25 is an elastically deformable plate-like member, and is provided with a detent roller 26 at a tip of the detent spring 25. The detent roller 26 fits into one of the concave portions 22. The detent spring 25 biases the detent roller 26 toward the center of rotation of the detent plate 21. When a predetermined or more rotating force is applied to the detent plate 21, the detent spring 25 elastically deforms, and the detent roller 26 moves between the concave portions 22, i.e., from one concave to the other. When the detent roller 26 is fitted into any one of the concave portions 22, a swinging motion of the detent plate 21 is regulated, and a position of the manual valve 28 along the axial direction and a state of the parking lock mechanism 30 are respectively determined, and the shift range of an automatic transmission 5 is fixed.

The parking lock mechanism 30 includes a parking rod 31, a conical member 32, a parking lock pawl 33, a shaft part 34 and a parking gear 35. The parking rod 31 is generally formed in an L shape, and one end 311 thereof is fixed onto the detent plate 21. The conical member 32 is provided to an other end 312 of the parking rod 31. The conical member 32 is formed in a conical shape diameter of which shrink toward the other end 312. When the detent plate 21 pivots in a reverse rotation direction, the conical member 32 moves in a P direction.

The parking lock pawl 33 is provided to abut on a conical surface of the conical member 32 and pivot about a shaft 34. On one side of the parking lock pawl 33 facing the parking gear 35, a protrusion 331 is provided to be engageable with the parking gear 35. When the detent plate 21 rotates in the reverse rotation direction and the conical member 32 moves in the P direction, the parking lock pawl 33 is pushed up so that the protrusion 331 is engaged with the parking gear 35. On the contrary, when the detent plate 21 rotates in a forward rotation direction and the conical member 32 moves in a NotP direction, the protrusion 331 is released from engagement with the parking gear 35.

The parking gear 35 is provided on an axle (not shown) to be capable of engaging the protrusion 331 of the parking lock pawl 33. When the parking gear 35 and the protrusion 331 are engaged with each other, the rotation of the axle is regulated. When the shift range is a NotP range, the parking gear 35 is not locked by the parking lock pawl 33 and the rotation of the axle is not restricted by the parking lock mechanism 30. When the shift range is a P range, the parking gear 35 is locked by the parking lock pawl 33 and the rotation of the axle is restricted.

Figure 3:
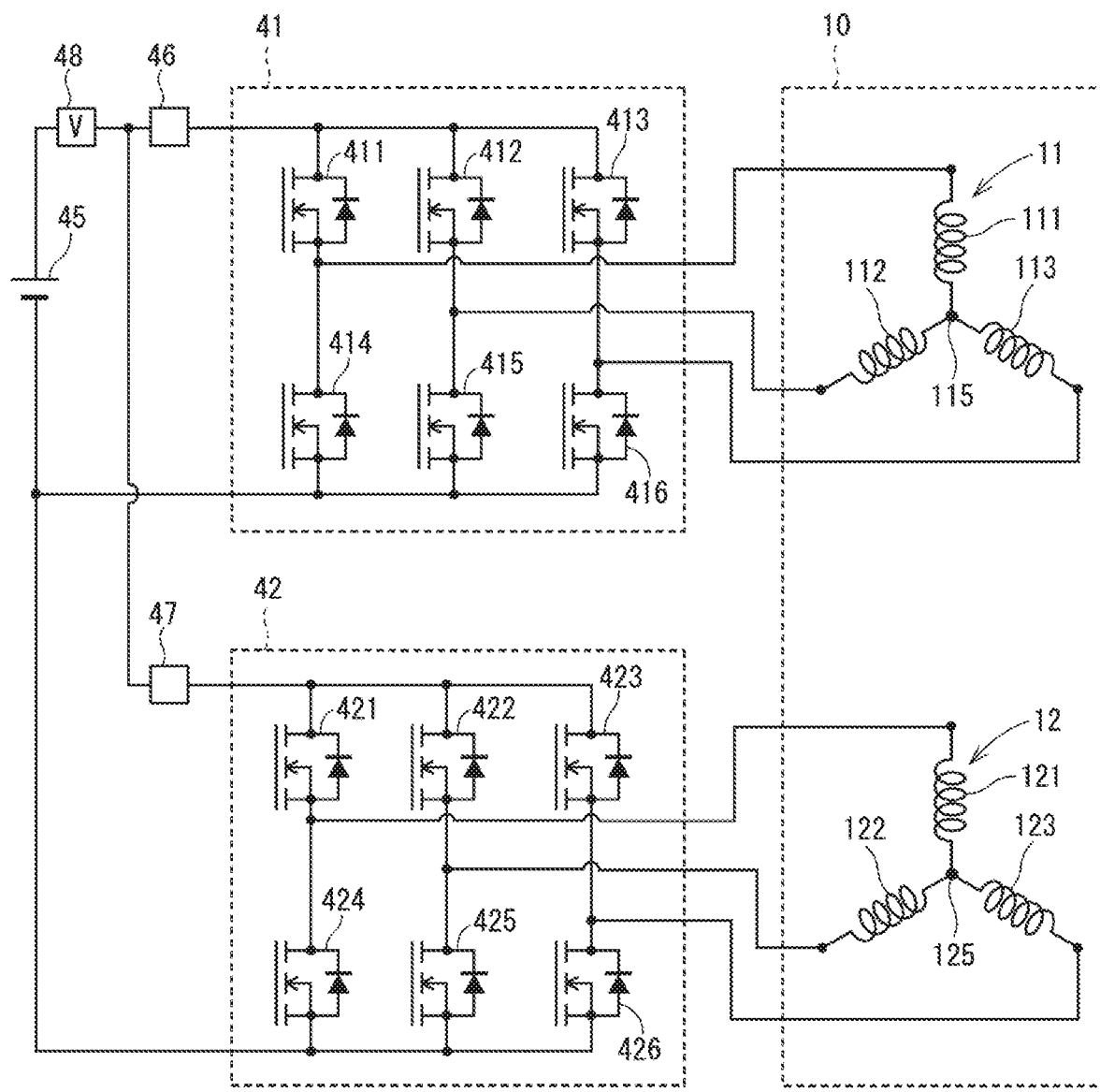
FIG. 3 is a circuit diagram of a motor and a motor driver according to the first embodiment.
Figure 4:
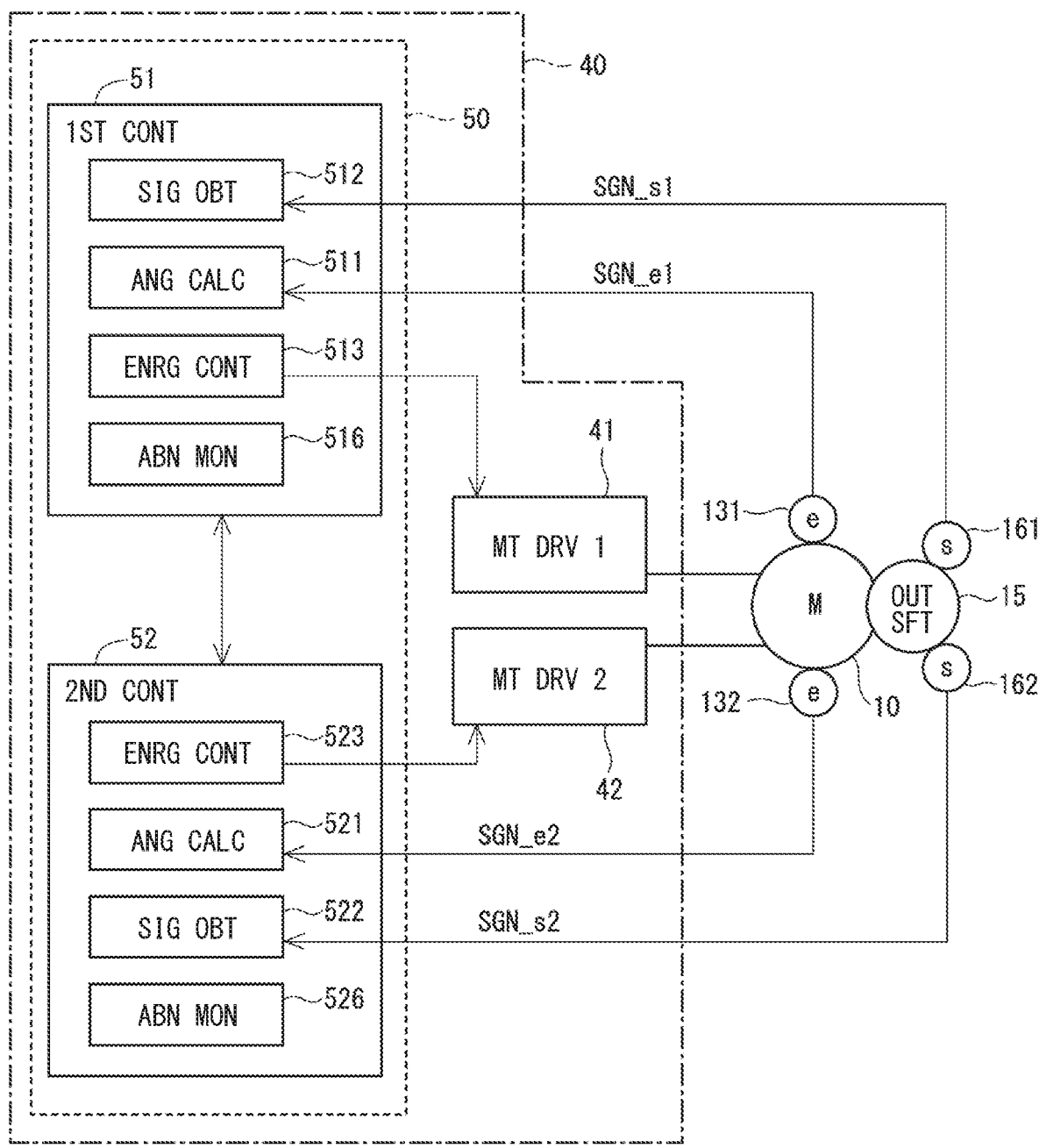
FIG. 4 is a block diagram of a shift range control device according to the first embodiment.

As shown in FIGS. 2 to 4, the shift range control device 40 includes motor drivers 41 and 42, control units 51 and 52, and the like. As shown in FIG. 3, the first motor driver 41 is a three-phase inverter that switches energization of a first motor winding 11, and switching elements 411 to 416 are bridge-connected. One end of a U1 coil 111 is connected to a connection point between the U-phase switching elements 411 and 414 which are paired with each other. One end of the V1 coil 112 is connected to a connection point between the V-phase switching elements 412 and 415 which are paired with each other. One end of the W1 coil 113 is connected to a connection point between the W-phase switching elements 413 and 416 which are paired with each other. The other ends of the coils 111 to 113 are connected to each other by a connection portion 115.

The second motor driver 42 is a three-phase inverter that switches energization of a second motor winding 12, and switching elements 421 to 426 are bridge-connected. One end of the U2 coil 121 is connected to a connection point of the U-phase switching elements 421 and 424 which are paired with each other. One end of the V2 coil 122 is connected to a connection point of the V-phase switching elements 422 and 425 which are paired with each other. One end of the W2 coil 123 is connected to a connection point of the W-phase switching elements 423 and 426 which are paired with each other. The other ends of the coils 121 to 123 are connected to each other by a connection portion 125. The switching elements 411 to 416 and 421 to 426 according to the present embodiment are respectively a metal-oxide field effect transistor or MOSFET, but may also be provided as other elements such as an insulated-gate bipolar transistor or IGBT.

As shown in FIGS. 2 and 3, a first motor relay 46 is provided at a position between the first motor driver 41 and a battery 45 to be switchable between conduction and interruption between the battery 45 and the first motor driver 41. A second motor relay 47 is provided at a position between the second motor driver 42 and the battery 45, to be switchable between conduction and interruption between the battery 45 and the second motor driver 42 is possible. A voltage sensor 48 for detecting a battery voltage V is provided on a high potential side of the battery 45.

An electronic control unit, or ECU, 50 controls switching of the shift range by controlling the on/off operation of the switching elements 411 to 416 and 421 to 426 and controlling the driving of the motor 10. The ECU 50 further controls the driving of a transmission hydraulic pressure control solenoid 6 based on a vehicle speed, an accelerator position, a driver-requested shift range and the like. By controlling the transmission hydraulic pressure control solenoid 6, the shift stage is controlled. The transmission hydraulic pressure control solenoid 6 is provided in number in correspondence to the number of the shift ranges and the like. In the present embodiment, one ECU 50 controls the driving of the motor 10 and the solenoid 6. However, the ECU 50 may be divided into a motor ECU for motor control and an AT-ECU for solenoid control (AT: automatic transmission). Hereinafter, the drive control for the motor 10 is mainly described.

The ECU 50 includes a first control unit 51 and a second control unit 52. Each of the control units 51 and 52 includes a CPU, a ROM, a RAM, an I/O, a bus line that connects these components, and the like (not shown). Each of processes performed by the ECU 50 may be software process or may be hardware process. The software process may be implemented by causing the CPU to execute a program. The program may be stored beforehand in a memory device such as a ROM, that is, in a readable, non-transitory tangible storage medium. The hardware process may be implemented by a special purpose electronic circuit. The control units 51 and 52 are respectively configured to be capable to communicate with each other through communication between microcomputers, and transmit and receive information to and from each other. Further, the control units 51 and 52 obtain a switching request that instructs switching of a shift range from an external control unit, which is not shown in the drawing.

Hereinafter, a combination of the first motor winding 11 and the first control unit 51 related to energization control of the first motor winding 11 is defined as a first system. A combination of the second motor winding 12 and the second control unit 52 related to energization control of the second motor winding 12 is defined as a second system. The subscript "1" is appended to the configuration and value of the first system, and the subscript "2" is appended to the value of the second system, as appropriate.

The first control unit 51 includes an angle calculation unit 511, a signal obtain unit 512, an energization control unit 513, an abnormality monitor unit 516, and the like. The angle calculation unit 511 obtains the encoder signal SGN_e1 output from the first encoder 131, counts pulse edges of the encoder signal SGN_e1, and calculates an encoder count value θen1. The signal obtain unit 512 obtains the output shaft signal SGN_s1 from the output shaft sensor 161, and calculates an output shaft angle θ_s1.

The energization control unit 513 controls energization to the motor winding 11. More specifically, the energization control unit 513 generates a control signal for controlling the on/off operation of the switching elements 411 to 416 of the first motor driver 41 and outputs the control signal to the first motor driver 41. The energization control unit 513 controls driving of the motor 10 by feedback control or the like so that the encoder count value θen1 becomes a target count value θcmd1 set according to a target shift range. The abnormality monitor unit 516 monitors abnormality in the first system.

The second control unit 52 includes an angle calculation unit 521, a signal obtain unit 522, an energization control unit 523, an abnormality monitor unit 526, and the like. The angle calculation unit 521 counts pulse edges of each phase of the encoder signal SGN_e2 output from the encoder 132, and calculates an encoder count value θen2. The signal obtain unit 522 obtains the output shaft signal SGN_s2 from the output shaft sensor 162.

The energization control unit 523 controls energization to the motor winding 12. More specifically, the energization control unit 523 generates a control signal for controlling the on/off operation of the switching elements 421 to 426 of the second motor driver 42 and outputs the control signal to the second motor driver 42. The energization control unit 523 controls driving of the motor 10 by feedback control or the like so that the encoder count value θen2 becomes a target count value θcmd2 set according to the target shift range. The abnormality monitor unit 526 monitors an abnormality in the second system.

Here, the relationship among the motor shaft 105 which is a rotating shaft of the motor 10, the output shaft 15, and the detent plate 21 is shown in FIG. 5. FIG. 5 schematically shows a state in which the motor 10 rotates from one state indicated by a solid line to a different state indicated by a two-dot chain line, and is fitted into the concave portion 22 corresponding to the driver requested shift range. Here, the concave portion corresponding to the P range is designated as a concave portion 221, the concave portion corresponding to the R range is designated as a concave portion 222, and a situation in which the two concave portions 221 and 222 are separated by a peak portion 225 is illustrated.

FIG. 5 shows a state in which the detent roller 26 is moved from the concave portion 221 to the concave portion 222 so that the rotation direction of the motor 10 and the output shaft 15 is the left-right direction on the paper surface and the shift range is switched from the P range to the R range. In reality, the detent roller 26 moves in the concave portion 22 as the detent plate 21 rotates, but in FIG. 5, the detent roller 26 is illustrated as moving. Here, FIG. 5 is a schematic view illustrating a "play" conceptually assuming that the output shaft 15 and the speed reducer 14 are integrated with each other and that the motor shaft 105 is movable within a range of play of the speed reducer 14. However, it may alternatively be configured such that the motor shaft 105 and the speed reducer 14 are integrated with each other and a play exists between the speed reducer 14 and the output shaft 15.

The speed reducer 14 is provided at a position between the motor shaft 105 and the output shaft 15, and "play" including gear backlash between the motor shaft 105 and the output shaft 15 exists. When the motor 10 rotates while the motor shaft 105 and the speed reducer 14 are separated from each other in the rotation direction, the motor 10 rotates in an idle state (i.e., driving nothing) until the motor shaft 105 and the speed reducer 14 come into contact with each other, thereby the rotation of the motor 10 is not transmitted to the output shaft 15. Hereinafter, when appropriate, a state in which the rotation of the motor 10 is not transmitted to the output shaft 15 within the range of play is referred to as an "idle with play" state, and a state in which the motor shaft 105 and the speed reducer 14 abut to each other at the end of the "idle with play" state is referred to as a "play diminish" state.

When idling with play ends, the motor 10, the output shaft 15 and the detent plate 21 rotate integrally as one body. As a result, the detent roller 26 moves beyond the peak portion 225 between the concave portions 221 and 222 to fall into the concave portion 222. When the detent roller 26 rises to an apex of the peak portion 225, the output shaft 15 is then driven by the biasing force of the detent spring 25 rather than by the motor 10, and when the detent roller 26 rolls down into the concave portion 222, the motor 10 stops at a position within the play.

By the way, in the present embodiment, the drive of one motor 10 is controlled by the two control units 51 and 52. Here, if an abnormality occurs in one of the two systems while the motor 10 is being driven, there may be a possibility that the drive control of the normal system is interfered with, and the motor 10 may be locked or may perform an unintended operation.

Therefore, in the present embodiment, when an abnormality that affects the drive control of the other system occurs while the motor 10 is being driven, after the abnormality detection, the abnormal system is promptly disconnected to prevent the drive control of the normal system from being interfered with. More specifically, after the abnormality detection, the energization to the abnormal system is turned off in a temporary abnormality state before the abnormality is confirmed.

Figure 6:
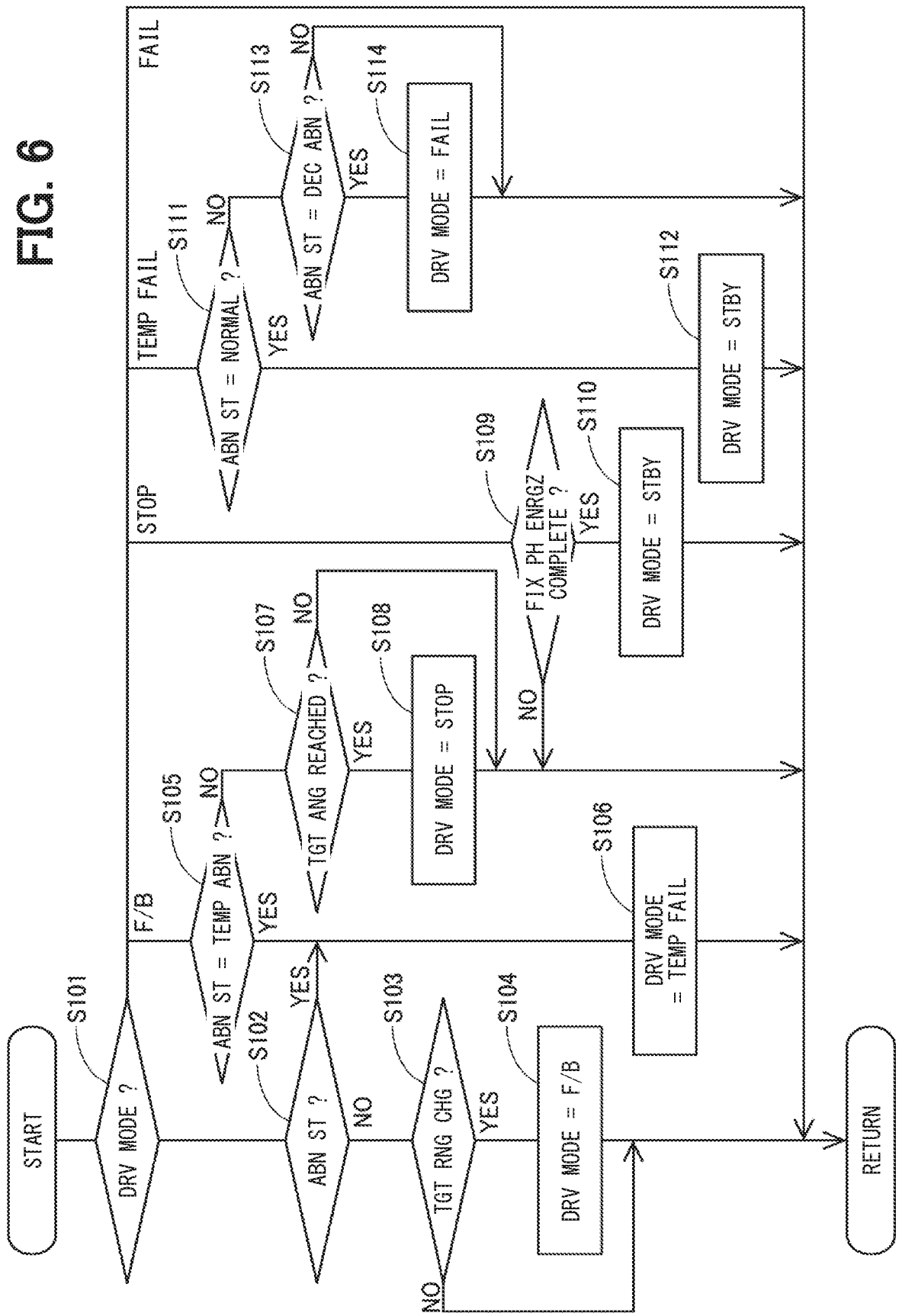
FIG. 6 is a flowchart of a drive mode selection process according to the first embodiment.

The drive mode selection process of the present embodiment is described based on the flowchart of FIG. 6. This process is performed in a predetermined cycle (for example, at an interval of 1 [ms]) by the control units 51 and 52 when a start switch of the vehicle such as an ignition switch is being turned on. Since the processes in FIGS. 6 to 9 are the same in both of the control units 51 and 52, the processes in the first control unit 51 is described hereafter. Also, subscripts related to the system number are omitted in the flowchart. Hereinafter, "step" of step S101 is simply shown as a symbol S. The same applies to other steps. In the drawing, feedback is described as "F/B". The same applies to other embodiments described later.

In S101, the first control unit 51 determines a drive mode. If the drive mode is a standby mode, the process proceeds to S012, if it is a feedback mode, the process proceeds to S105, if it is a stop mode, the process proceeds to S109, and if it is a temporary fail mode, the process proceeds to S111. In it is a fail mode, since such an abnormality is a confirmed one, the energization of the own system is turned off. More specifically, when the first system is abnormal, the first control unit 51 turns off the first motor relay 46. Further, when the second system is abnormal, the second control unit 52 turns off the second motor relay 47.

In S102 to which the process proceeds when the drive mode is the feedback mode, the first control unit 51 determines whether or not an abnormal state is a temporary abnormality. The abnormal state determination (i.e., the determination regarding a state of abnormality) is performed by a separate process described later. When it is determined that the abnormal state is a temporary abnormality (S102: YES), the process proceeds to S106, and the drive mode is set to a temporary fail mode. When it is determined that the abnormal state is not a temporary abnormality (S102:NO), the process proceeds to S103.

In S103, the first control unit 51 determines whether or not a target range has been changed. When it is determined that the target range has not been changed (S103:NO), the standby mode is continued without performing the process of S104. When it is determined that the target range has been changed (S103:YES), the process proceeds to S104, and the drive mode is switched to the feedback mode.

In S105, which is shifted when the drive mode is the feedback mode, the first control unit 51 determines whether or not the abnormal state is a temporary abnormality. When it is determined that the abnormal state is a temporary abnormality (S105:YES), the process proceeds to S106, and the drive mode is switched to the temporary fail mode. When it is determined that the abnormal state is not a temporary abnormality (S105:NO), the process proceeds to S107.

In S107, the first control unit 51 determines whether or not the rotation position of the motor 10 has reached a target angle. In the present embodiment, when the encoder count value $\theta en1$ falls within a predetermined range including the target count value $\theta cmd1$ (for example, ±2 counts), it is determined that the target angle has been reached. When it is determined that the rotation position of the motor 10 has not yet reached the target angle (S107:NO), the feedback mode is continued. When it is determined that the rotation position of the motor 10 has reached the target angle (S107:YES), the process proceeds to S108, and the drive mode is switched to the stop mode. In the stop mode, the motor 10 is stopped by fixed phase energization to two phases according to the encoder count value $\theta en1$.

In S109, to which the process proceeds when the drive mode is the stop mode, the first control unit 51 determines whether or not a fixed phase energization continuation time has elapsed since the fixed phase energization has started, for a determination of whether the fixed phase energization is complete. The fixed phase energization continuation time is set according to the time required to stop the motor 10.

When it is determined that the fixed phase energization is not complete (S109:NO), the stop mode is continued. When it is determined that the fixed phase energization is complete (S109:YES), the process proceeds to S110, and the drive mode is switched to the standby mode.

Hereinafter, the abnormal state can include both a normal state, and a not normal state. In S111 to which the process proceeds when the drive mode is the temporary fail mode, the first control unit 51 determines whether or not the abnormal state is normal. When it is determined that the abnormal state is normal (S111:YES), the process proceeds to S112, and the drive mode is switched to the standby mode. When recovering from a temporary abnormality, the motor drive is performed as a normal system at the next range switching time by switching to the standby mode. When it is determined that the abnormal state is not normal (S111: NO), the process proceeds to S113.

In S113, the first control unit 51 determines whether the abnormal state is a decisive abnormality. When it is determined that the abnormal state is not the decisive abnormality (S113:NO), the temporary abnormality is continued. When it is determined that the abnormal state is the decisive abnormality (S113:YES), the process proceeds to S114, and the drive mode is switched to the fail mode.

Figure 7:
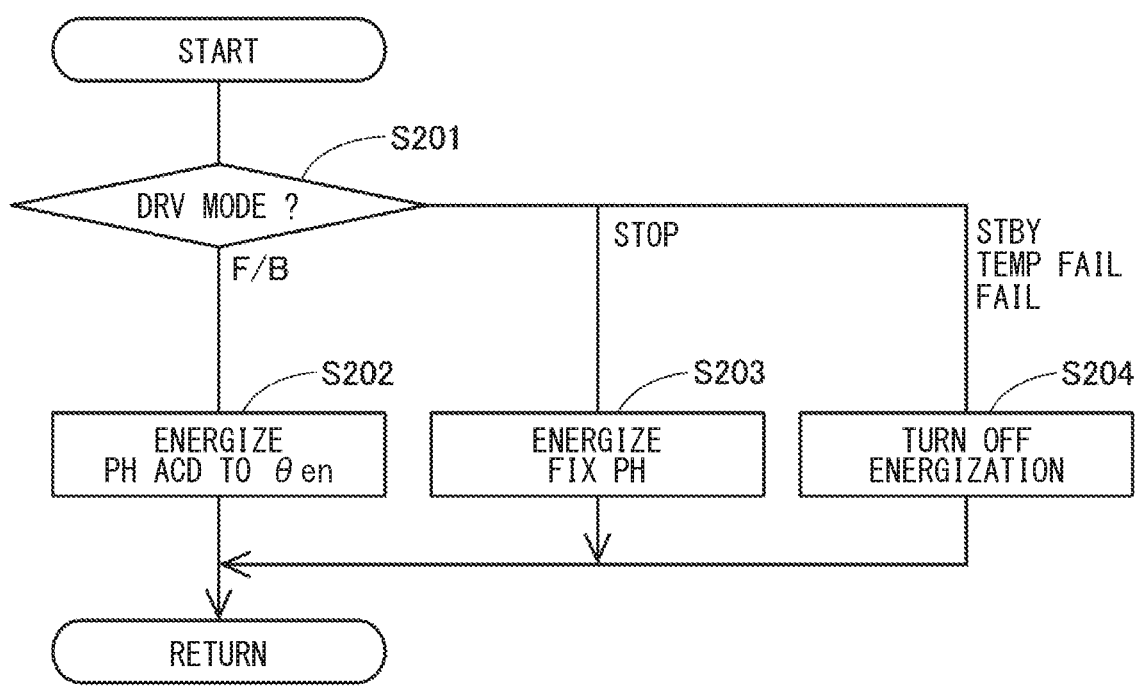
FIG. 7 is a flowchart of an energization control process according to the first embodiment.
Figure 8:
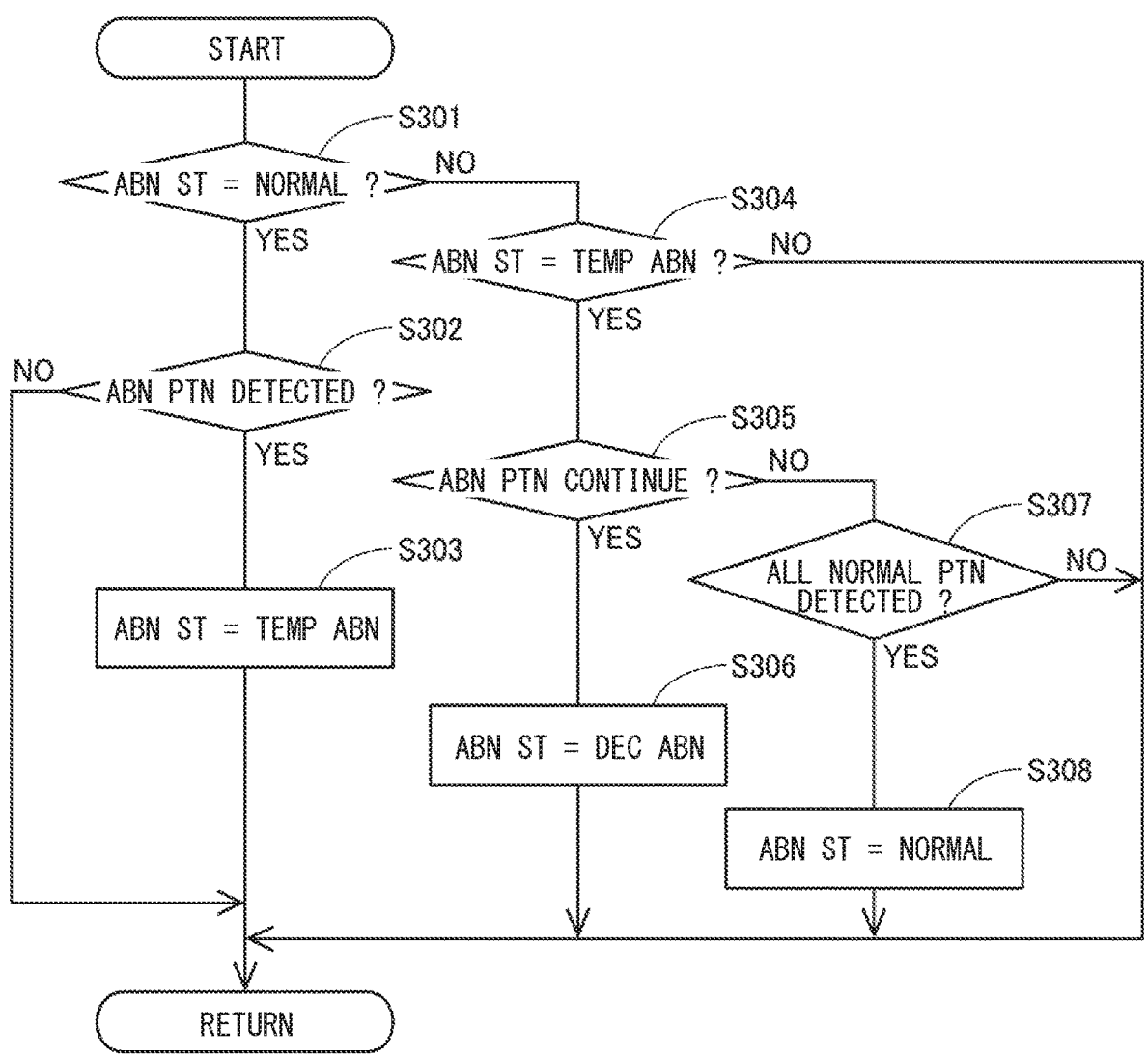
FIG. 8 is a flowchart of an encoder abnormality diagnosis process according to the first embodiment.

The energization control process is described based on the flowchart of FIG. 7. This process is performed in a predetermined cycle (for example, at an interval of 1 [ms]) or by an encoder edge interrupt. In S201, the first control unit 51 determines the drive mode. When the drive mode is the feedback mode, the process proceeds to S202, and the phase corresponding to the encoder count value $\theta en1$ is energized. When the drive mode is the stop mode, the process proceeds to S203 and the fixed phase is energized. When the drive mode is the standby mode, the temporary fail mode, or the fail mode, the process proceeds to S204 and the energization is turned off.

In the present embodiment, an encoder abnormality is described as an abnormality that affects the drive control of the other system. An encoder abnormality diagnosis process is described based on the flowchart of FIG. 8. This process is performed in a predetermined cycle (for example, at an interval of 1 [ms]).

In S301, the first control unit 51 determines whether or not the abnormal state is normal. When it is determined that the abnormal state is normal (i.e., when the state of abnormality is determined as normal, indicating that no abnormality is detected), (S301:YES), the process proceeds to S302. When it is determined that the abnormal state is not normal (S301:NO), the process proceeds to S304.

In S302, the first control unit 51 determines whether or not an abnormal encoder pattern has been detected. Here, it is desirable to determine the temporary abnormality as soon as possible, and when a temporary abnormality detection time T1 shorter than time for a decisive abnormality determination has elapsed, an affirmative determination is made. Instead of determination by time, determination may be made by the number of detections. S305 and S307 may also be similarly determined based on the number of detections. When it is determined that an abnormal encoder pattern has not been detected (S302:NO), "normal" is continued as an abnormal state. When it is determined that an abnormal encoder pattern has been detected (S302:YES), the process proceeds to S303, and the abnormal state is switched to a temporary abnormality.

In S304 to which the process proceeds when it is determined that the abnormal state is not normal (S301:NO), the first control unit 51 determines whether or not the abnormal state is a temporary abnormality. When it is determined that the abnormal state is not a temporary abnormality (S304: NO), that is, when it is determined as a decisive abnormality, the following processes are not performed, and the process proceeds to "return." When it is determined that the abnormal state is a temporary abnormality (S304:YES), the process proceeds to S305.

In S305, the first control unit 51 determines whether or not the abnormal encoder pattern has continued for an abnormality determination time T2. When it is determined that the abnormal encoder pattern has continued for the abnormality determination time T2 (S305:YES), the process proceeds to S306, and the abnormal state is switched to the decisive abnormality. When it is determined that the abnormal encoder pattern has not continued for the abnormality determination time T2 (S305:NO), the process proceeds to S307.

In S307, the first control unit 51 determines whether or not a state in which all normal encoder patterns are detected continues for a normal return determination time T3. When it is determined that the state of detecting all normal encoder patterns has not continued for the normal return determination time T3, the temporary abnormality state is continued. When it is determined that the state in which all normal encoder patterns are detected has continued for the normal return determination time T3 (S307:YES), the process proceeds to S308, and the abnormal state is switched to normal.

Figure 9:
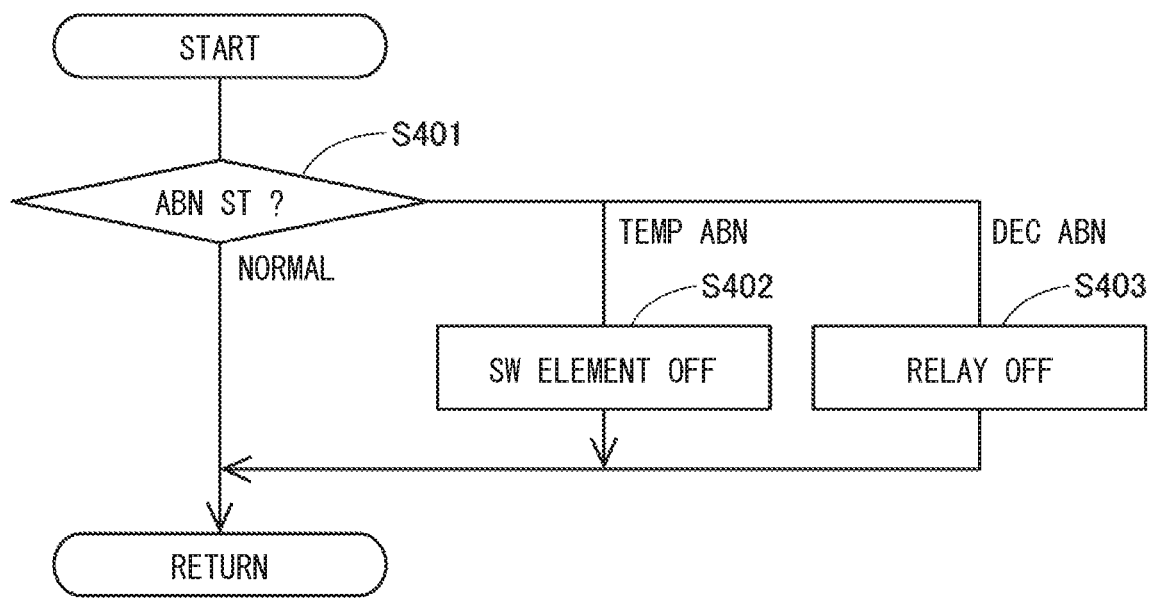
FIG. 9 is a flowchart of an encoder abnormal time process according to the first embodiment.

The encoder abnormal time process is described with reference to the flowchart of FIG. 9. In S401, the first control unit 51 determines an abnormal state. When the abnormal state is normal (i.e., when state of abnormality is determined as normal, indicating that no abnormality is detected), the abnormal time process is not performed. When the abnormal state is a temporary abnormality, the process proceeds to S402, and the switching elements 411 to 416 are turned off. When the abnormal state is a decisive abnormality, the process proceeds to S403, the motor relay 46 is turned off, and the power supply from the battery 45 to the first system is interrupted. In the second system, the switching elements 421 to 426 are turned off in case of a temporary abnormality, and the motor relay 47 is turned off in case of the decisive abnormality.

Figure 10:
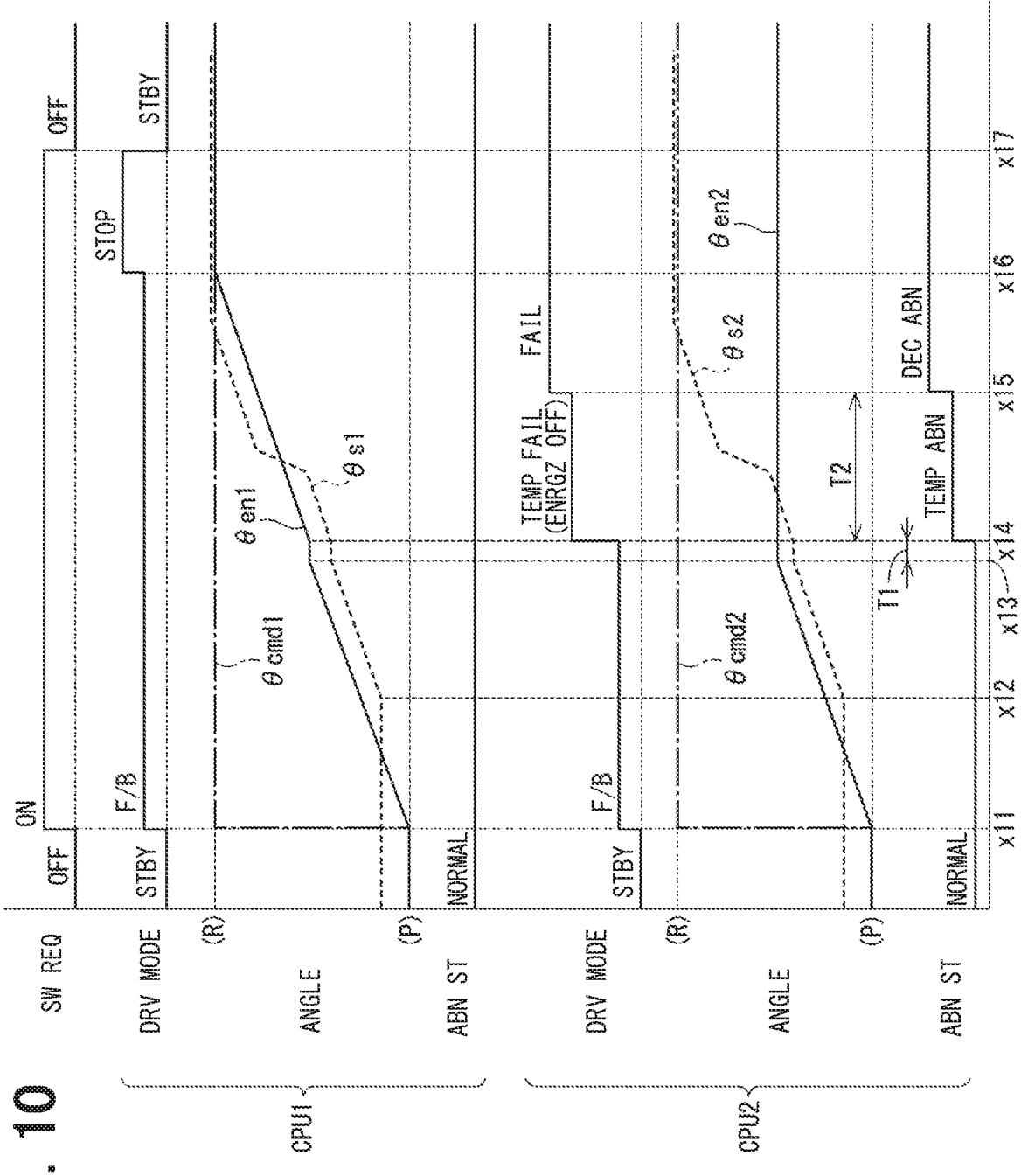
FIG. 10 is a time chart of a motor drive process according to the first embodiment.
Figure 11:
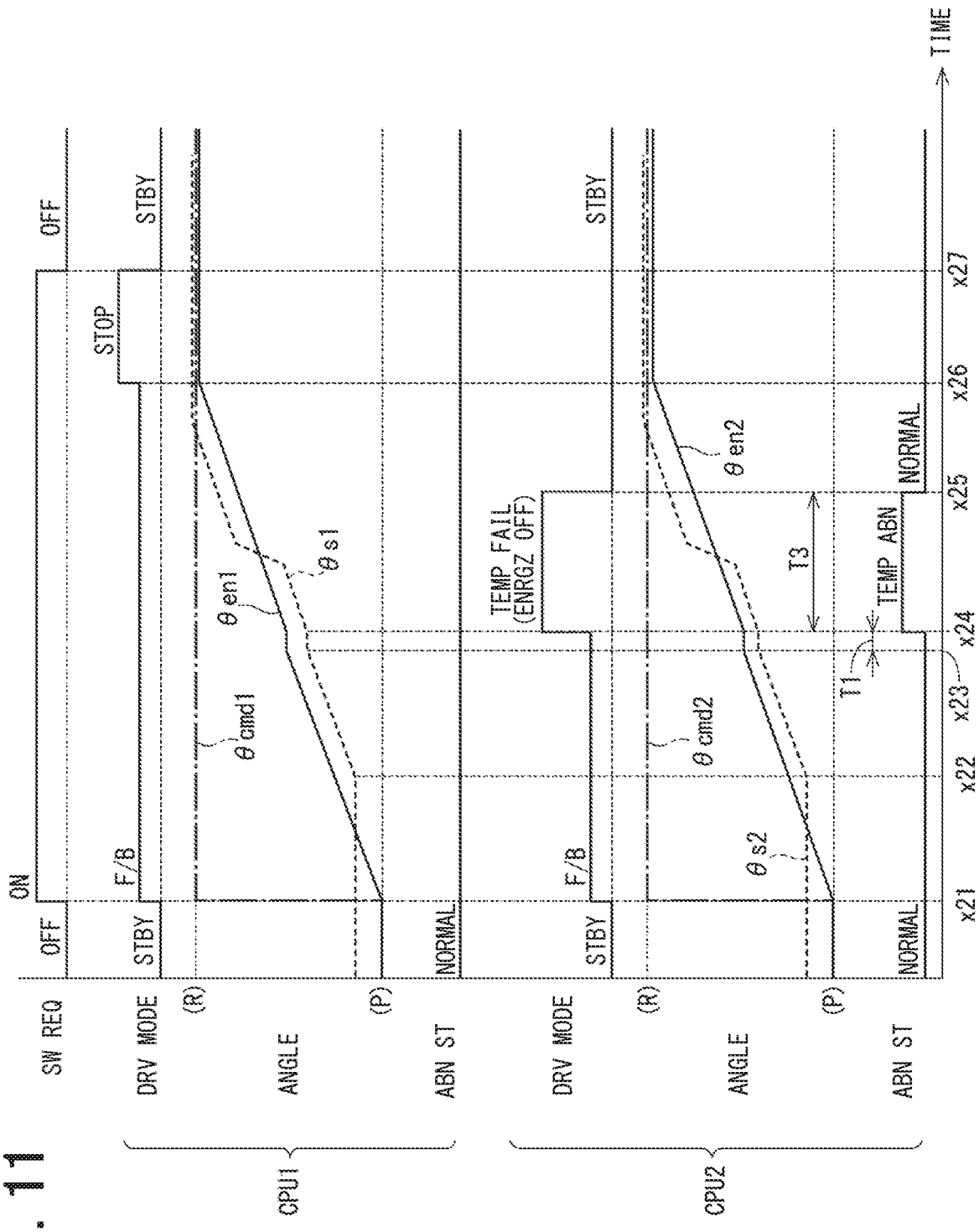
FIG. 11 is another time chart of the motor drive process according to the first embodiment.

The motor drive process of the present embodiment is described based on the time chart of FIG. 10 and FIG. 11. In FIGS. 10 and 11, a switch request is shown in a top-mode row, the first system is shown in an upper row, and the second system is shown in a lower row. In the drawing, processing in the first system is referred to as "CPU1", and the second system processing in the second system is referred to as "CPU2." In each system, the switch request, a drive mode, motor and output shaft angles, and abnormal state are shown from top to bottom. The motor angle is described as encoder count values θen1 and θen2, and the output shaft angles θs1 and θs2 are described as values converted into encoder count values. Further, the shift range P and the shift range R are respectively shown as (P) and (R) in the drawing. The same applies to a time chart for describing a motor drive process of an embodiment described later. Here, a situation in which an abnormality occurs in the second system is described as an example.

In the control units 51 and 52, when the switch request is turned on at time x11, the target range is changed. Here, the target range is changed from the P range to the R range. When the switch request is turned on, the drive mode is changed from the standby mode to the feedback mode, and the drive of the motor 10 is started. When the play idle ends at time x12, the output shaft 15 is driven. Further, when the detent roller 26 passes the peak portion 225 during the feedback control, the output shaft 15 is advanced by the biasing force of the detent spring 25.

When an abnormality occurs in the encoder count value θen2 at time x13, the first system is affected by the abnormality caused in the second system. In the example of FIG. 10, the rotation speed of the motor 10 decreases. Therefore, the second control unit 52 turns off the energization to the second system at time x14 when the temporary abnormality detection time T1 has elapsed, while setting the abnormal state to the temporary abnormality and the drive mode to the temporary fail mode. Here, the switching elements 421 to 426 are turned off. Note that, in a temporary abnormality, the energization to the second system may be turned off by turning off the second motor relay 47. In the present embodiment, the influence on the first system is suppressed by immediately turning off the energization to the second system, which is the abnormal system, at the stage of the temporary abnormality before the abnormality is determined as decisive. When the energization to the second system is turned off, the first system is not affected by the second system, so the rotation speed of the motor 10 is recovered and the motor 10 is driven by the first system.

When the encoder count value θen1 reaches the target count value θcmd1 at time x16, the first control unit 51 switches the drive mode from the feedback mode to the stop mode, and stops the motor 10 by the fixed phase energization. The drive mode is switched from the stop mode to the standby mode at time x17 when the fixed phase energization continuation time has elapsed from time x16.

As described above, after time x14, the motor 10 is driven by the first system. In FIG. 10, the encoder count value θen2 does not change after time x14. Therefore, at time x15 when the abnormality determination time T2 has elapsed from time x14 when the abnormal state becomes a temporary abnormality, the abnormal state is set as a decisive abnormality, and the drive mode is set as the fail mode.

In FIG. 11, the process from time x21 to time x24 is the same as the process from time x11 to time x14 in FIG. 10, and the process from time x26 to time x27 is the same as the process from time x16 to time x17 in FIG. 10. In an example of FIG. 11, the abnormality detected at time x23 is a temporary abnormality such as missing count, for example. After time x24, as the motor 10 is driven by the first system, the encoder count value θen2 changes in the normal pattern. At time x25 when the normal return determination time T3 has elapsed from time x24 when the abnormal state becomes the temporary abnormality, the abnormal state is switched from the temporary abnormality to normal, and the drive mode is switched from the temporary fail mode to the standby mode.

By switching the drive mode to the standby mode at time x25, the drive control of the motor 10 can be performed on an assumption that the second system is normal at the next range switching. Note that the encoder count value θen2 at the completion of the range switching is a value smaller than the target count value θcmd2 because of the missing count due to a temporary abnormality. However, at the next range switching, the encoder count value θen2 of the above (i.e., a smaller value) is used to set the target count value θcmd2, thereby causing no problem.

As described above, the shift range control device 40 of the present embodiment switches the shift range by controlling the driving of the motor 10, and includes a plurality of control units 51 and 52 and a plurality of motor drivers 41, 42. The control units 51 and 52 include the energization control units 513 and 523 that control energization of the motor 10 and the abnormality monitor units 516 and 526 that perform abnormality monitoring. The motor drivers 41 and 42 have the switching elements 411 to 416 and 421 to 426, and are provided corresponding to the control units 51 and 52, respectively. More specifically, the first motor driver 41 is provided corresponding to the first control unit 51, and the second motor driver 42 is provided corresponding to the second control unit 52. Here, a configuration of components group provided corresponding to each control unit is a system.

The energization control units 513 and 523 turn off the energization of the own system in the temporary abnormality state before the determination of the decisive abnormality, when an abnormality affecting the other system occurs during driving of the motor 10 by the plurality of systems. In such case, energization in the other system in which no abnormality has occurred is continued, and driving of the motor 10 is continued. The abnormality monitor units 516 and 526 determine whether the abnormality is a temporary abnormality or a decisive abnormality after turning off the energization of the own system. In such manner, even if an abnormality affecting the other systems occurs in some system(s), the motor 10 can be driven and the shift range can be switched without interfering with the normal system.

The encoders 131 and 132 that detect the rotation position of the motor 10 are provided respectively for the control units 51 and 52. In the present embodiment, the abnormality affecting the other system is an abnormality of the encoders 131 and 132, and the abnormality monitor units 156 and 256 determine whether the abnormality is temporary or decisive based on the detection values of the encoders 131 and 231 from the turning off of the energization of the own system in the temporary abnormality state to the completion of the range switching. In such manner, it is possible to appropriately determine whether the abnormality occurring in the encoders 131 and 231 is a temporary abnormality or a decisive abnormality.

At a position between the battery 45 and the motor drivers 41 and 42, the motor relays 46 and 47 capable of interrupting the power supply from the battery 45 are provided. The energization control units 513 and 523 turn off the energization of the own system by turning off the motor drivers 41 and 42 of the own system in the temporary abnormality state, and when the decisive abnormality is determined, the motor relays 46 and 47 of the own system are turned off. Here, in the first system, turning off the switching elements 411 to 416 corresponds to "turning off the driving circuit", and, in the second system, turning off the switching elements 421 to 426 corresponds to "turning off the driving circuit." In such manner, when abnormality occurs in the encoders 131 and 132, it is possible to appropriately interrupt the energization to the own system.

Second Embodiment

Figure 12:
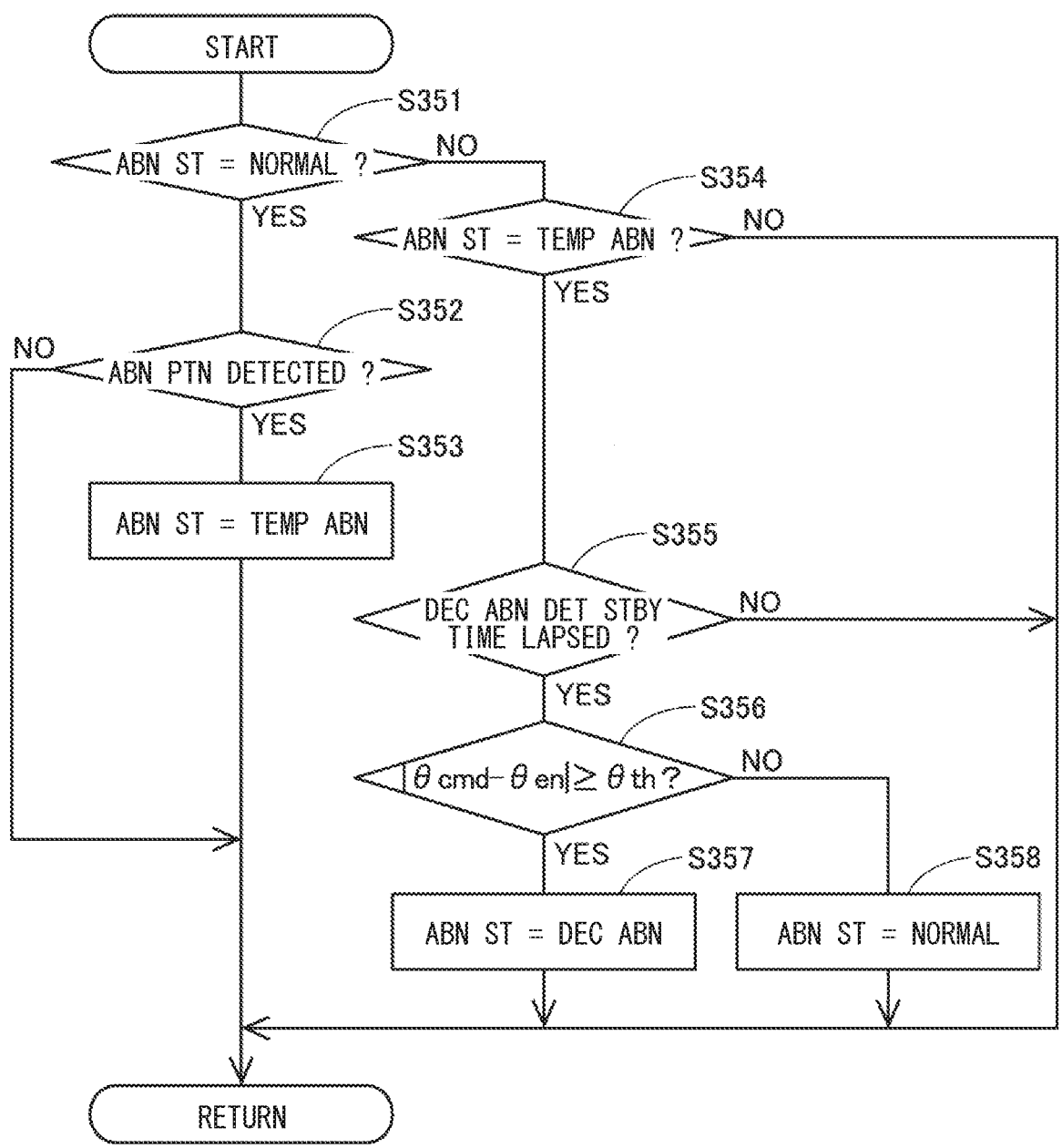
FIG. 12 is a flowchart of the encoder abnormal time process according to a second embodiment.
Figure 13:
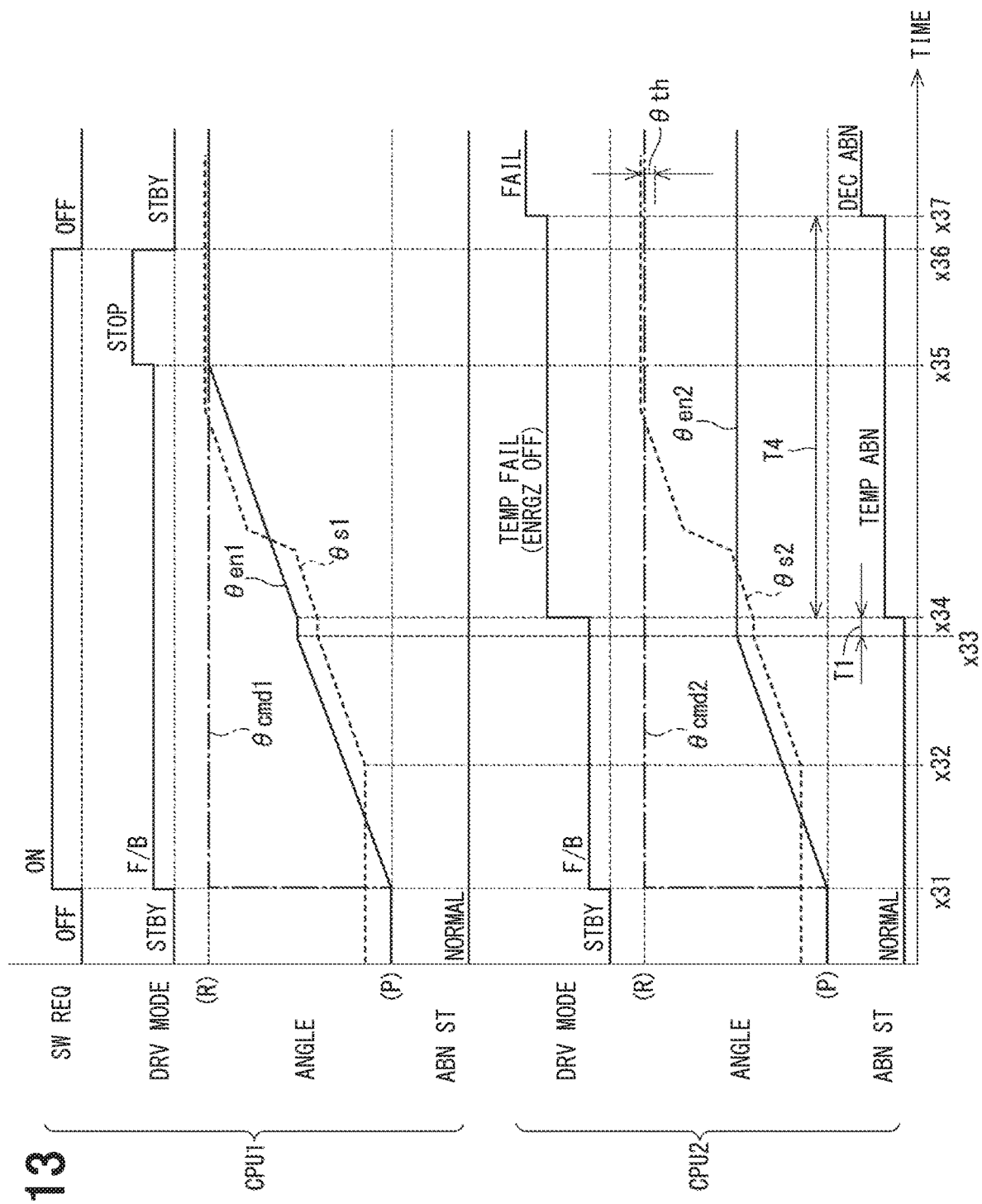
FIG. 13 is a time chart of the motor drive process according to the second embodiment.
Figure 14:
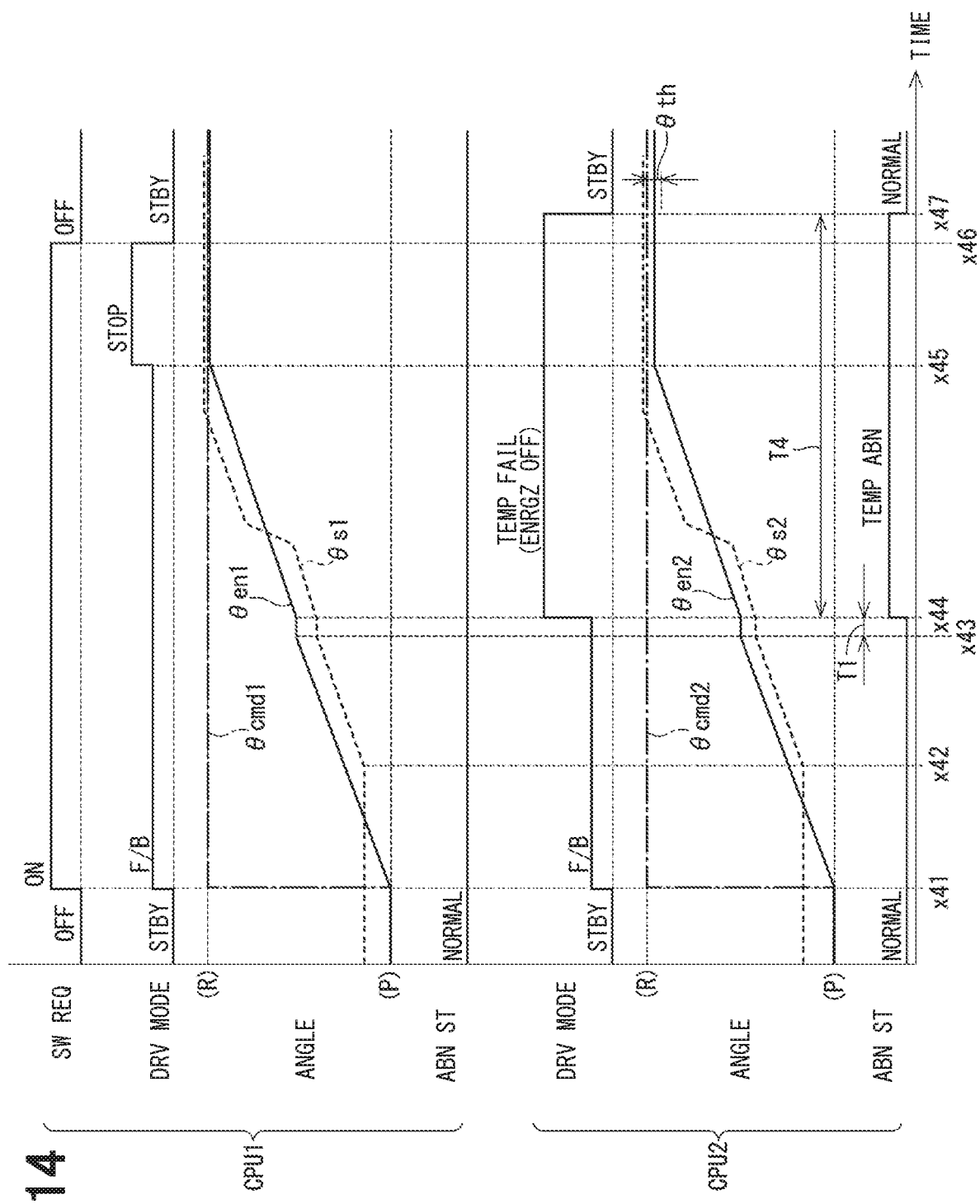
FIG. 14 is another time chart of the motor drive process according to the second embodiment.

The second embodiment is shown in FIG. 12 to FIG. 14. In the present embodiment, the encoder abnormality diagnosis process is different from that in the above embodiment, and the difference is mainly described in the following. The encoder abnormality diagnosis process of the present embodiment is described based on the flowchart of FIG. 12. The processes of S351 to S354 are similar to the processes of S301 to S304 in FIG. 8. When it is determined in S354 that the abnormal state is a temporary abnormality (S354: YES), the process proceeds to S355.

In S355, the first control unit 51 determines whether or not a decisive abnormality determination standby time T4 has elapsed since the abnormal state has become a temporary abnormality. The decisive abnormality determination standby time T4 is set so that the decisive abnormality determination is made after the completion of shift range switching. Further, instead of the determination based on the decisive abnormality determination standby time T4, by obtaining information from the control unit of the other system, an affirmative determination may be made when the shift range switching is complete. When it is determined that the decisive abnormality determination standby time T4 has not elapsed (S355:NO), the temporary abnormality is continued. When it is determined that the decisive abnormality determination standby time T4 has elapsed (S355:YES), the process proceeds to S356.

In S356, the first control unit 51 determines whether or not an absolute value of the difference between the target count value θcmd1 and a current encoder count value θen1 is equal to or greater than a decisive abnormality determination value θth. The decisive abnormality determination value θth is set according to a value that is acceptable as a temporary erroneous count. When it is determined that the absolute value of the difference between the target count value θcmd1 and the current encoder count value θen1 is equal to or greater than the actual abnormality determined value θth (S356:YES), the process proceeds to S357, and the abnormal state is switched to the decisive abnormality. When it is determined that the absolute value of the difference between the target count value θcmd1 and the current encoder count value θen1 is less than the decisive abnormality determination value θth (S356:NO), the process proceeds to S358, and the abnormal state is switched to normal.

The motor drive process of the present embodiment is described based on the time chart of FIG. 13 and FIG. 14. In FIG. 13, the process from time x31 to time x34 is the same as the process from time x11 to time x14 in FIG. 10, and when the abnormal state of the second system becomes a temporarily abnormality, the motor 10 is driven by the first system. The process from time x35 to time x36 is the same as the process from time x16 to time x17 in FIG. 10. When the motor position reaches the target position at time x35, the drive mode is switched from the feedback mode to the stop mode, and the motor 10 is stopped by the fixed phase energization, and the drive mode is switched to the standby mode at time x36 when the fixed phase energization continuation time has elapsed.

At time x37 when the decisive abnormality determination standby time T4 has elapsed since the abnormal state has become a temporary abnormality, since the difference between the target count value θcmd2 and the encoder count value θen2 is equal to or greater than the decisive abnormality determination value θth in the second system, the decisive abnormality is determined and the drive mode is set to the fail mode.

In an example of FIG. 14, the process from time x41 to time x44 is the same as the process from time x11 to time x14 in FIG. 10, and the process from time x45 to time x46 is the same as the process from time x16 to time x17 in FIG. 10. In FIG. 14, the abnormality detected at time x43 is a temporary abnormality, and the encoder count value θen2 changes as the motor 10 is driven in the first system. Therefore, at time x46 when the shift range switching is complete, the encoder count value θen2 is substantially the same value as the target count value θcmd2. More specifically, the encoder count value θen2 and the target count value θcmd2 are different from each other due to missing count and control error.

Since the difference between the target count value θcmd2 and the encoder count value θen2 is less than the final decisive abnormality determination value θth in the second system at time x47 after the lapse of the decisive abnormality determination standby time T4 from time x44, i.e., when the abnormal state has become a temporary abnormality, the abnormal state is determined as normal and the drive mode is set to the standby mode. In such manner, at the time of the next shift range switching, the drive control of the motor 10 can be performed based on an assumption that the second system is normal. Further, even when an abnormality diagnosis based on a signal pattern during the motor driving is not performable due to, for example, the use of the two phase encoder as the rotation position sensor, the abnormality determination is still appropriately performable by determining whether or not the decisive abnormality is being caused based on the difference between the target count value θcmd and the encoder count value θen after the completion of the shift range switching.

In the present embodiment, after the shift range switching is complete, the abnormality monitor units 516 and 526 respectively determine whether the abnormal state is a temporary abnormality or a decisive abnormality based on the difference between the target count value θcmd corresponding to the target range set at the time of shift range switching and the encoder count value θen corresponding to the detection values of the encoders 131 and 132. In such manner, it is possible to appropriately determine whether the abnormality occurring in the encoders 131 and 231 is a temporary abnormality or a decisive abnormality. Further, the present embodiment also provides the same advantages as those of the above embodiment.

Third Embodiment

The third embodiment is illustrated in FIGS. 15 to 19. In the first embodiment and the second embodiment, the encoder abnormality has been described as an abnormality that affects driving of the other system. In the present embodiment, an abnormality (hereinafter referred to as an "element-on abnormality") in which the switching elements 411 to 416 and 421 to 426 cannot be interrupted is described as an abnormality that affects driving of the other system. The process of the present embodiment can be performed in parallel with the process related to the encoder abnormality of the first embodiment or the second embodiment. The drive mode selection process and the energization control process are the same as the ones in the above embodiments.

Figure 15:
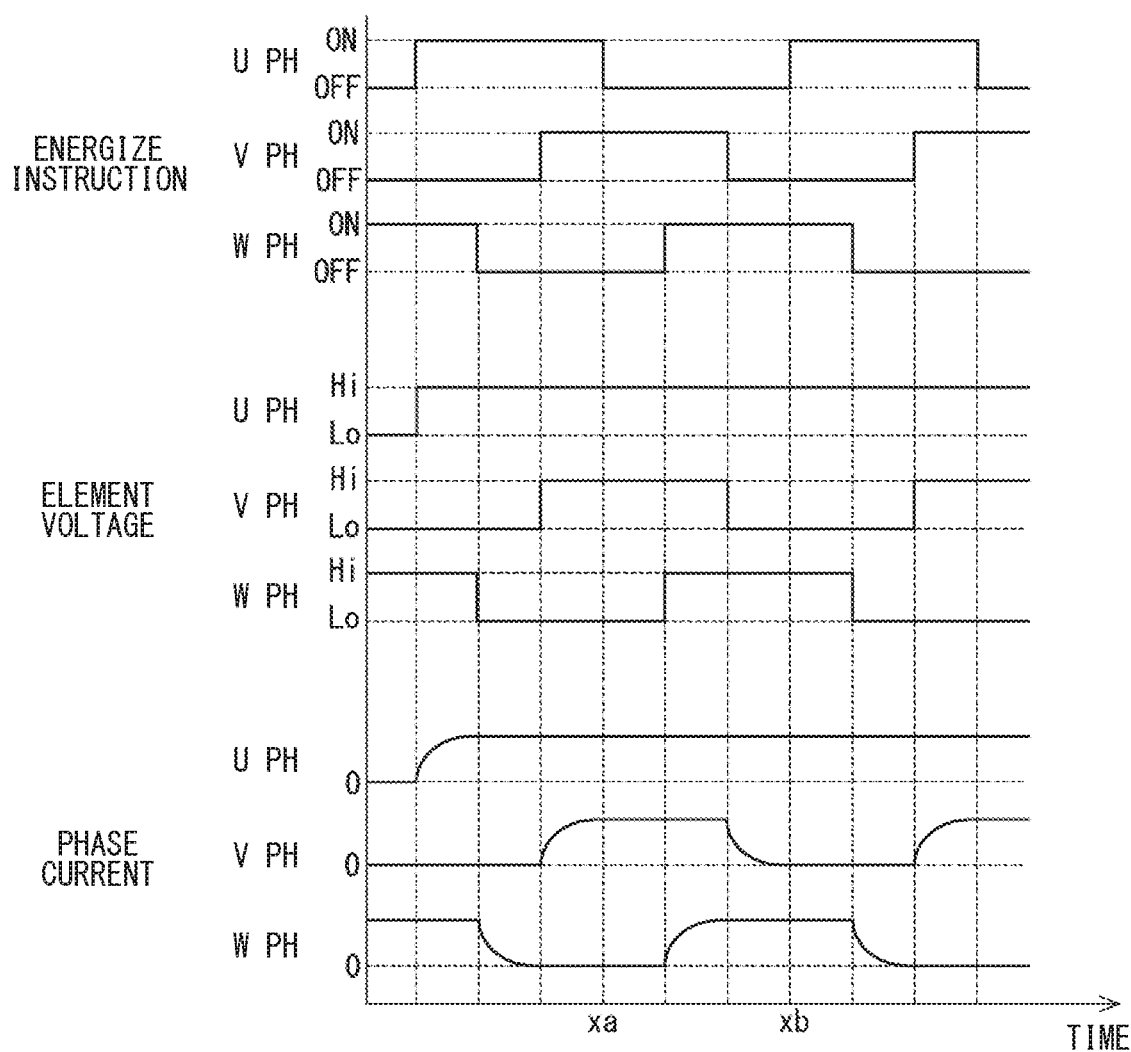
FIG. 15 is a time chart of an element voltage and a phase current at an element-on abnormal time according to a third embodiment.

FIG. 15 shows energization instruction, element voltage, and phase current from the top row, with the common, horizontal time axis, respectively for a U phase, a V phase, and a W phase, respectively. As shown in FIG. 15, when the energization instruction is turned on, the element voltage becomes Hi and an electric current flows. When the energization instruction is turned off, the element voltage becomes Lo and the electric current becomes zero.

Here, when an element-on abnormality occurs in the U phase, a U-phase energization instruction is off during a period from time xa to time xb, but the element voltage remains Hi, and the energization instruction and the voltage level are not the same. Further, although the U-phase energization instruction is off, the electric current does not become zero, and the electric current continues to flow in the U-phase. Therefore, in the present embodiment, the element-on abnormality is detected based on the element voltage or the phase current at the time of energization off instruction.

In case of an element-on abnormality, since the switching element having an abnormality cannot be turned off, energization to the abnormal system is turned off by the turning off of the motor relay of the abnormal system from (i.e., as early as) the temporary abnormality stage, for the disconnection of the abnormal system from the normal one. That is, when an element-on abnormality occurs in the first system, the first motor relay 46 is turned off, and when an element-on abnormality occurs in the second system, the second motor relay 47 is turned off.

Figure 16:
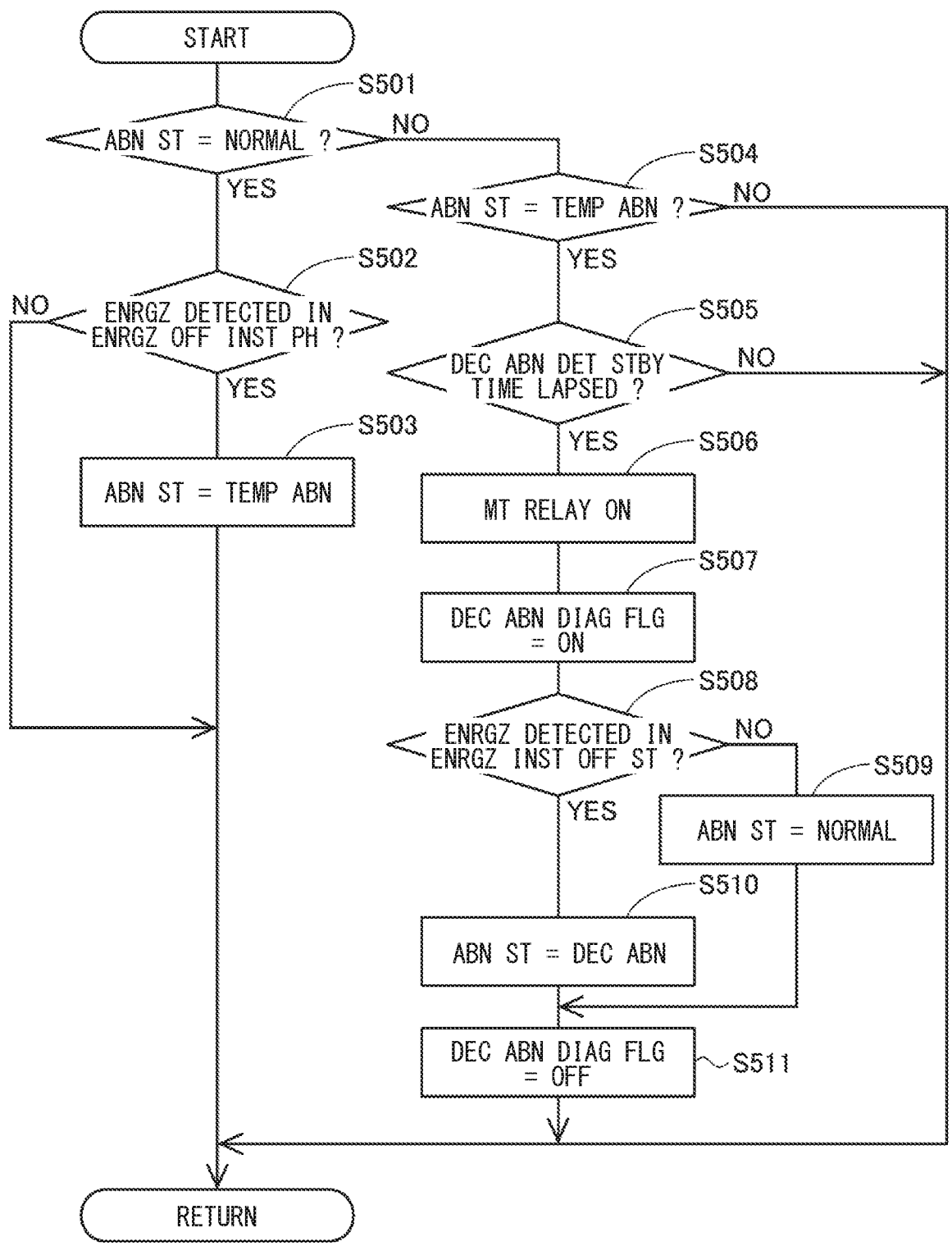
FIG. 16 is a flowchart of an element-on abnormality diagnosis process according to the third embodiment.

An element-on abnormality diagnosis process is described based on the flowchart of FIG. 16. This process is performed in a predetermined cycle (for example, at an interval of 1 [ms]). In S501, the first control unit 51 determines whether or not the abnormal state is normal. When it is determined that the abnormal state is normal (i.e., when state of abnormality is determined as normal, indicating that no abnormality is detected) (S501:YES), the process proceeds to S502. When it is determined that the abnormal state is not normal (S501:NO), the process proceeds to S504.

In S502, the first control unit 51 determines whether or not energization has been detected in a phase for which energization is instructed to be turned off. Here, it is desirable to determine the temporary abnormality as soon as possible, and when the temporary abnormality detection time T1 shorter than time for a decisive abnormality determination has elapsed, an affirmative determination is made. Instead of determination by time, determination may be made by the number of detections. Whether or not energization is performed is determined by at least one of the element voltage and the phase current as described with reference to FIG. 15. When energization of a phase for which energization is instructed to be turned off is not detected (S502:NO), the abnormal state continues as normal. When energization of a phase for which energization is instructed to be turned off is detected (S502:YES), the process proceeds to S503, and the abnormal state is switched to a temporary abnormality. Thereby, the motor relay 46 of the own system is turned off by an element-on abnormal time process described later.

Processes in S504 and S505 are similar to the processes in S354 and S355 in FIG. 12. When it is determined that the abnormal state is a temporary abnormality and the decisive abnormality determination standby time T4 has not elapsed (S505:NO), it is determined that the temporary abnormality continues. When it is determined that the decisive abnormality determination standby time T4 has elapsed (S505:YES), the process proceeds to S506.

The first control unit 51 turns on the motor relay 46 in S506, and turns on a decisive abnormality diagnosis flag in S507 to perform a decisive abnormality diagnosis. In S508, the first control unit 51 makes an affirmative determination when the energization state of the switching elements 411 to 416 is detected during an energization off instruction time of the relevant one of the switching elements 411 to 416 at least for an abnormality determination time T5. The abnormality determination time T5 is set to a duration of time that can avoid erroneous determination due to noise or the like. When the energization instruction is off and energization is not detected (S508:NO), the process proceeds to S509 and the abnormal state is switched to normal. When energization is detected in a state where the energization instruction is off (S508:YES), the process proceeds to S510, and the abnormal state is switched to the decisive abnormality. In S511, the first control unit 51 turns off the decisive abnormality diagnosis flag.

Figure 17:
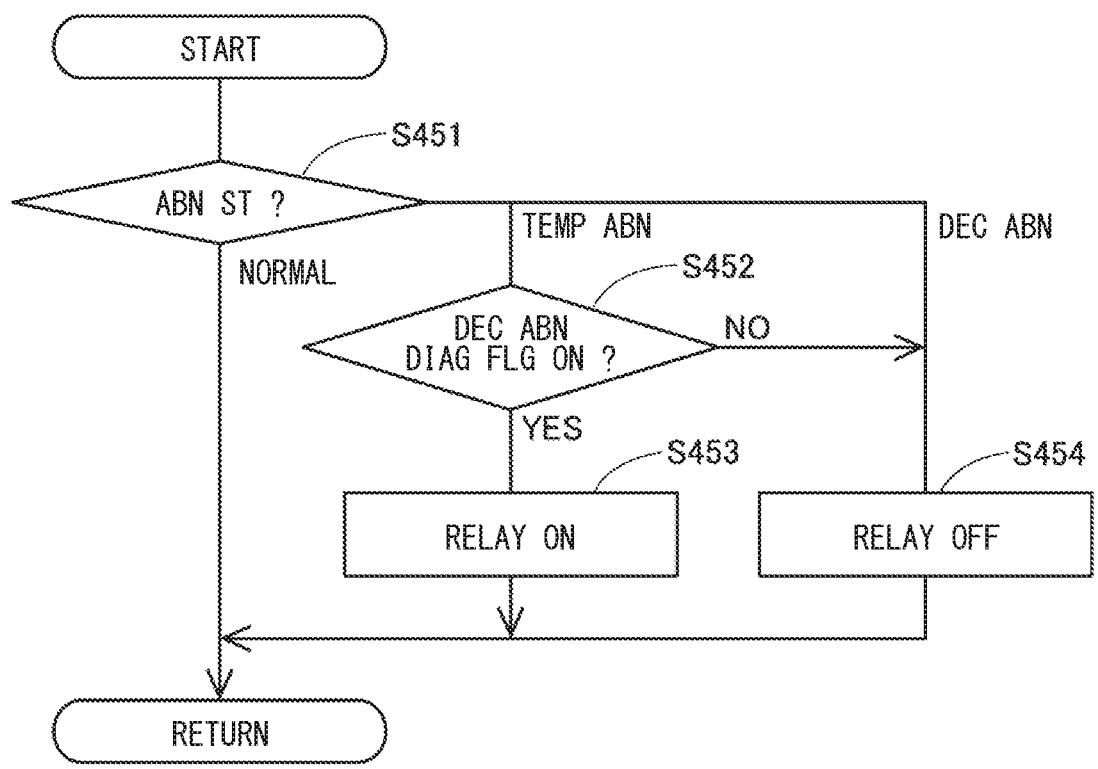
FIG. 17 is a flowchart of an element-on abnormal time process according to the third embodiment.

The element-on abnormal time process when the switching element has on-abnormality is described with reference to the flowchart of FIG. 17. In S451, the first control unit 51 determines an abnormal state. When the abnormal state is normal (i.e., when state of abnormality is determined as normal), the abnormal time process is not performed. When the abnormal state is a temporary abnormality, the process proceeds to S452, and when the abnormal state is a decisive abnormality, the process proceeds to S454.

In S452, the first control unit 51 determines whether or not the decisive abnormality diagnosis flag is set. When it is determined that the decisive abnormality diagnosis flag is set (S452:YES), the process proceeds to S453, and the motor relay 46 of the own system is turned on. When the abnormal state is a decisive abnormality, or when the abnormal state is a temporary abnormality and the decisive abnormality diagnosis flag is not set (S452:NO), the motor relay 46 of the own system is turned off.

Figure 18:
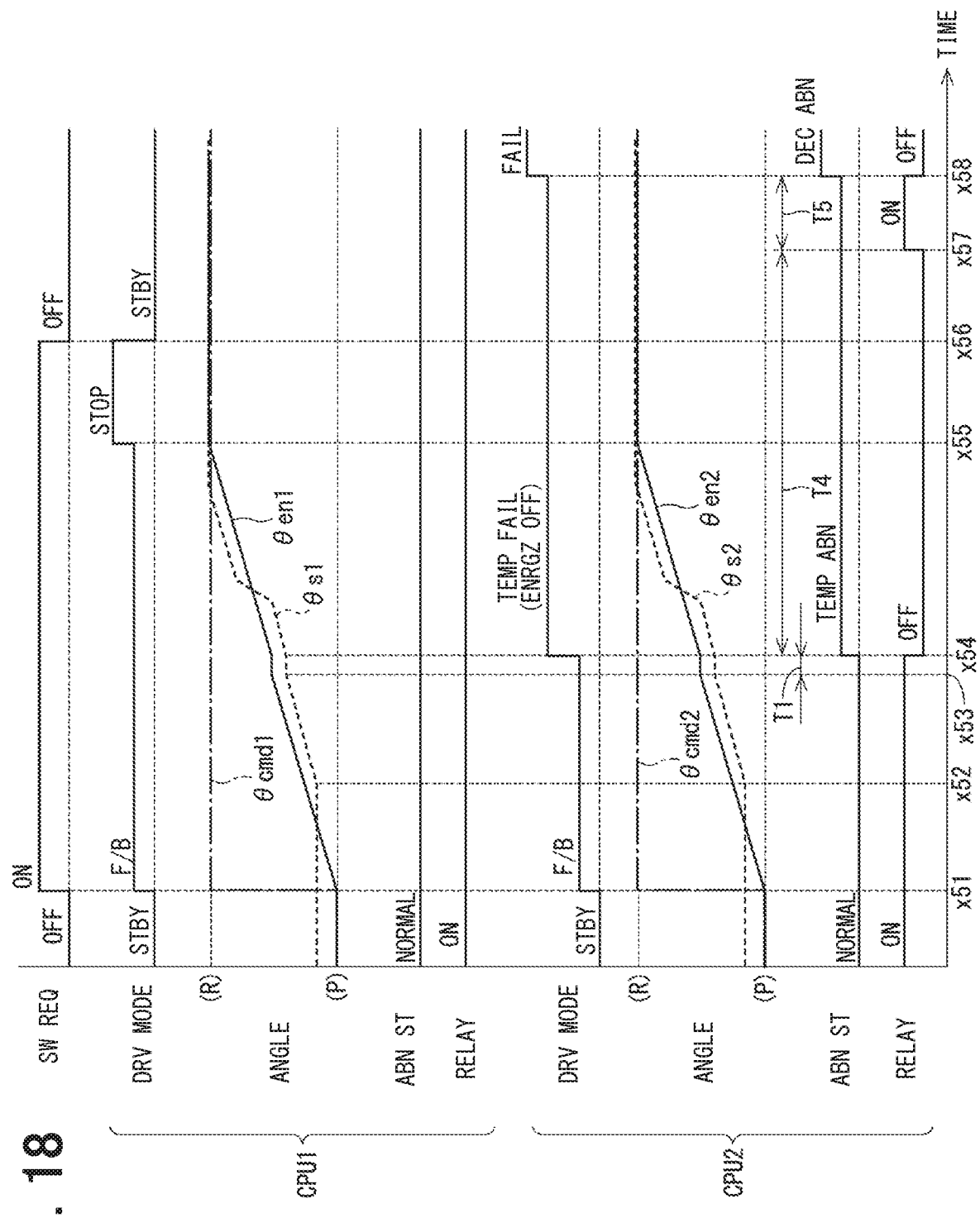
FIG. 18 is a time chart of the motor drive process according to the third embodiment.
Figure 19:
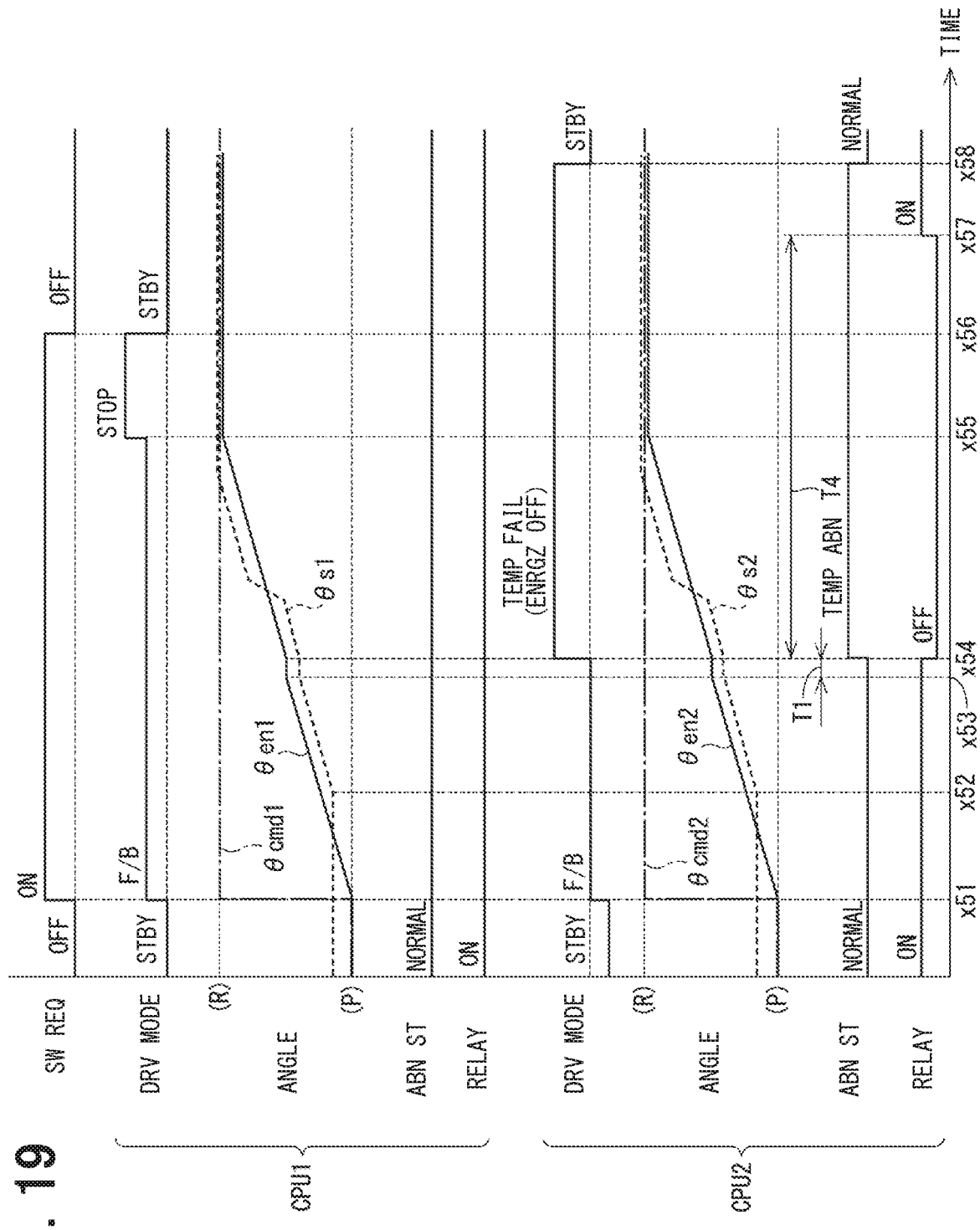
FIG. 19 is another time chart of the motor drive process according to the third embodiment.

The motor drive process of the present embodiment is described based on the time chart of FIG. 18 and FIG. 19. In FIG. 18 and FIG. 19, the on/off state of the motor relay is shown under the abnormal state for each system. In FIG. 18, the process from time x51 to time x54 is the same as that from time x11 to time x14 in FIG. 10. In the present embodiment, since the abnormality that occurred at time x53 is an element-on abnormality, when a temporary abnormality occurs at time x54, the motor relay 47 is turned off to interrupt the supply of the electric power to the second system, and the motor 10 is driven by the first system. The process from time x55 to time x56 is the same as the process from time x16 to time x17 in FIG. 10. That is, when the motor rotation position reaches the target position at time x55, the drive mode is switched from the feedback mode to the stop mode, and the motor 10 is stopped by the fixed phase energization, and the drive mode is switched further to the standby mode at time x56 when the fixed phase energization continuation time has elapsed.

The decisive abnormality diagnosis is performed at time x57 after the lapse of the decisive abnormality determination standby time T4 from time x54, i.e., when the abnormal state is determined as a temporary abnormality. More specifically, the motor relay 47 is turned on while the first system is in a standby state and the switching elements 421 to 426 are turned off. Here, when an electric current flows, the abnormal state is switched to the decisive abnormality at time x58 when the abnormality determination time T5 has elapsed from time x57, and the drive mode is set to the fail mode. Further, the motor relay 47 is turned off.

On the other hand, as shown in FIG. 19, when the motor relay 47 is turned on at time x57, when no electric current flows, the abnormal state is switched to normal at time x58, and the drive mode is set to the standby mode. Further, the motor relay 47 remains in the on state. As a result, at the next shift range switching, the drive control of the motor 10 is performed based on an assumption that the second system is normal.

In the present embodiment, the abnormality that affects the other system is an element-on abnormality in which the switching elements 411 to 416 and 421 to 426 cannot be interrupted. The energization control units 513 and 523 turn off the energization of the own system by turning off the motor relays 46 and 47 of the own system in the temporary abnormality state. The abnormality monitor units 516 and 526 determine whether the abnormality is a temporary abnormality based on the energization state when the motor relays 46 and 47 of the own system are turned on after the shift range switching is complete. In such manner, it is possible to appropriately distinguish whether the abnormality occurring in the switching elements 411 to 416 and 421 to 426 is a temporary abnormality or a decisive abnormality. Further, the present embodiment also provides the same advantages as those of the above embodiment.

In the above embodiment, the motor drivers 41 and 42 correspond to a "drive circuit," the motor relays 46 and 47 correspond to an "interruption unit", and the encoders 131 and 132 correspond to a "rotation position sensor." Further, the target count values θcmd1 and θcmd2 correspond to a "target rotation position," and the encoder count values θen1 and θen2 correspond to a "motor position."

OTHER EMBODIMENTS

In the embodiments described above, the motor is a DC brushless motor. In other embodiments, the motor may be other than a DC brushless motor. In the above embodiments, two motor drive control systems are provided. In other embodiments, three or more motor drive control systems may be provided. In the above embodiments, an encoder is provided for each system. In other embodiments, an encoder signal of one encoder may be shared by a plurality of control units. Similarly for the output shaft sensor, the detection value of one output shaft sensor may be shared by a plurality of systems. In the above embodiments, encoder abnormality and element-on abnormality are exemplified as "abnormality affecting the other system(s)." In other embodiments, the abnormality affecting the other system(s) may be abnormality other than the encoder abnormality and the element-on abnormality.

In the above embodiments, the motor rotation angle sensor is a three-phase encoder. In other embodiments, the motor rotation angle sensor may be a two-phase encoder, and is not limited to an encoder, i.e., may be a resolver or the like. In the above embodiments, the potentiometer is shown as an output shaft sensor. In other embodiments, an output shaft sensor other than the potentiometer may be used, or the output shaft sensor may be omitted.

In the above embodiments, four concave portions are provided on the detent plate. In other embodiments, the number of concave portions is not limited to four, and may be any number. For example, two concave portions on the detent plate may be used to switch between the P range and the NotP range. Further, the shift range switching mechanism, the parking lock mechanism and the like may be different from those described in the above embodiments.

In the above embodiments, the speed reducer is disposed at a position between the motor shaft and the output shaft. Although the details of the speed reducer are not described in the embodiments described above, it may be configured as a device including, for example, a cycloid gear, a planetary gear, a spur gear that transmits torque from a speed reduction mechanism substantially coaxial with the motor shaft to a drive shaft, or any combination of these gears. Further, in other embodiments, the speed reducer between the motor shaft and the output shaft may be omitted, or a mechanism other than the speed reducer may be provided.

Control units and relevant methods described in the present disclosure may be implemented by programming a special purpose computer which is configured with a memory and a processor programmed to execute one or more particular functions embodied as computer programs. Alternatively, the control unit described in the present disclosure and the method thereof may be realized by a special purpose computer configured as a processor having one or more dedicated hardware logic circuits. Alternatively, the control unit and the method described in the present disclosure may be realized by one or more special purpose computers, which is a combination of (i) a programmable special purpose computer having a processor and a memory, which are programmed to perform one or more functions, and (ii) a hardware-logic special purpose computer having a processor with one or more hardware logic circuits. The computer programs may be stored, as instructions being performed by a computer, in a tangible, non-transitory computer-readable storage medium. The present disclosure is not limited to the above embodiments, and various modifications may be implemented without departing from the spirit of the present disclosure.

What is claimed is:

1. A shift range control device that switches a shift range by controlling driving of a motor, the shift range control device comprising:
    a plurality of control units having an energization control unit configured to control energization to the motor, and an abnormality monitor unit configured to perform abnormality monitoring; and
    a plurality of drive circuits having switching elements and provided corresponding to respective control units, wherein
    a configuration of components group corresponding to each of the plurality of control units is provided as a system, providing a plurality of systems in the shift range control device at least as an own system and an other system,
    the energization control unit turns off energization of the own system in a state of temporary abnormality before determining a decisive abnormality when abnormality affecting an other system is detected in the own system while driving the motor by the plurality of systems, and
    the abnormality monitor unit determines whether the state of abnormality is a temporary abnormality or the decisive abnormality after turning off energization of the own system.

2. The shift range control device according to claim 1 further comprising:
    a rotation position sensor configured to detect a rotation position of the motor provided for each of the plurality of control units, wherein
    abnormality affecting the other system is an abnormality of the rotation position sensor, and
    the abnormality monitor unit determines whether the state of abnormality is the temporary abnormality or the decisive abnormality based on a detection value of the rotation position sensor during a period from the turning off of energization of the own system in the state of temporary abnormality to completion of the shift range switching.

3. The shift range control device according to claim 2, wherein
    an interruption unit configured to interrupt supply of electric power from a battery is provided for each system at a position between the battery and the drive circuit, and
    the energization control unit turns off energization of the own system by turning off the drive circuit of the own system in the state of temporary abnormality, and interrupts the interruption unit of the own system when the decisive abnormality is determined.

4. The shift range control device according to claim 1 further comprising:
    a rotation position sensor configured to detect a rotation position of the motor provided for each of the plurality of control units, wherein
    abnormality affecting the other system is an abnormality of the rotation position sensor, and
    the abnormality monitor unit determines whether the state of abnormality is the temporary abnormality or the decisive abnormality based on a difference between a preset target rotation position and a detection value of the rotation position sensor after completion of the shift range switching.

5. The shift range control device according to claim 1, wherein
    an interruption unit configured to interrupt supply of electric power from a battery is provided for each system at a position between the battery and the drive circuit,
    abnormality affecting the other system is an element-on abnormality in which the switching element cannot be interrupted,
    the energization control unit turns off energization of the own system by interrupting the interruption unit of the own system in the state of temporary abnormality, and
    the abnormality monitor unit determines whether the state of abnormality is the temporary abnormality or the decisive abnormality based on an energization state when the interruption unit of the own system is made conductive after completion of the shift range switching.

6. A method of switching a shift range by controlling driving of a motor the method comprising:
    turning off energization of an own system in a state of temporary abnormality before determining a decisive state of abnormality when abnormality affecting an other system is detected in the own system, and
    determining whether the state of abnormality is a temporary abnormality or the decisive state of abnormality after turning off energization of the own system.

7. The method according to claim 6, further comprising:
    determining whether the state of abnormality is the temporary abnormality or the decisive abnormality based on a detection value of a rotation position sensor during a period from the turning off of energization of the own system in the state of temporary abnormality to completion of the shift range switching.

8. The method according to claim 6, further comprising:
    determining whether the state of abnormality is the temporary abnormality or the decisive abnormality based on a difference between a preset target rotation position and a detection value of a rotation position sensor after completion of the shift range switching.

* * * * *